(12) United States Patent
Mochizuki et al.

(10) Patent No.: US 7,873,550 B2
(45) Date of Patent: Jan. 18, 2011

(54) PROCESS CONTROL SYSTEM AND PROCESS CONTROL METHOD

(75) Inventors: Tomoyuki Mochizuki, Yokohama (JP); Nobutoshi Sagawa, Koganei (JP); Yoji Taniguchi, Yokohama (JP); Yuichi Kobayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/515,815

(22) Filed: Sep. 6, 2006

(65) Prior Publication Data

US 2007/0038675 A1 Feb. 15, 2007

(51) Int. Cl.
*A01K 5/02* (2006.01)
*G06F 17/30* (2006.01)
(52) U.S. Cl. ..................................... 705/29; 707/104.1
(58) Field of Classification Search ................... 705/29, 705/1
See application file for complete search history.

(56) References Cited

U.S. PATENT DOCUMENTS

| | | | | |
|---|---|---|---|---|
| 6,016,501 | A | * | 1/2000 | Martin et al. ............... 707/203 |
| 6,925,343 | B2 | * | 8/2005 | Satoguchi et al. ............. 700/96 |
| 2002/0138282 | A1 | * | 9/2002 | Aber et al. ...................... 705/1 |
| 2004/0236449 | A1 | * | 11/2004 | Satoguchi et al. ........... 700/103 |
| 2007/0038675 | A1 | * | 2/2007 | Mochizuki et al. ........ 707/104.1 |

FOREIGN PATENT DOCUMENTS

| JP | 10-244448 | | 9/1998 |
|---|---|---|---|
| JP | 10244448 | A  * | 9/1998 |
| JP | 2002-163393 | | 6/2002 |
| JP | 2003308368 | A  * | 10/2003 |

OTHER PUBLICATIONS

Marquez, Adolfo Crespo; Herguedas, Antonio Sanchez Journal of Quality in Maintenance Engineering v10 n4 pp. 254-262 2004.*
"A rational, step-wise approach to process characterization." Biopharm International Aug. 3, 2003, v. 16, n. 8, p. 24.*

* cited by examiner

*Primary Examiner*—Matthew S. Gart
*Assistant Examiner*—Oluseye Iwarere
(74) *Attorney, Agent, or Firm*—Antonelli, Terry, Stout & Kraus, LLP.

(57) ABSTRACT

In a process control system according to the present invention, a history record table, a history record relationship table, a process table, and a process relationship table are provided. The history record table stores information on a history record. The history record relationship table stores information on a history record relationship. The process table stores information on a process. The process relationship table stores information on a process relationship. When a history record is received, history records of the previous process and the next process are searched. Then, both of the history record relationship between a history record of the present process and a history record of the previous process and the history record relationship between the history record of the present process and a history record of the next process are created. Then, using the process table, the process relationship table, and history record information that has been already collected, history records that have not been received are estimated and then are displayed according to work order.

With such arrangement, it is possible to trace a product item correctly even when some of history records are not registered since time required to register a history is varied depending on the processes or for other reasons, or there are not some of necessary history records.

11 Claims, 18 Drawing Sheets

| PROCESS ID | WORK PLACE | TYPE OF PRODUCT ITEM | TYPE OF WORK |
|---|---|---|---|
| P11 | FACTORY 1 | PC | SHIPMENT |
| P12 | FACTORY 2 | PC | SHIPMENT |
| P21 | WAREHOUSE 1 | PC | INSPECTION |
| P22 | WAREHOUSE 2 | PC | INSPECTION |
| P31 | CENTER 1 | PC | INSPECTION |
| P32 | CENTER 2 | PC | INSPECTION |
| P41 | SHOP 1 | PC | RECEIPT |
| P42 | SHOP 2 | PC | RECEIPT |
| P51 | FACTORY 1 | PROCESSING UNIT | WAREHOUSING |
| P52 | FACTORY 1 | PROCESSING UNIT | DELIVERY |
| P53 | FACTORY 1 | DISPLAY | WAREHOUSING |
| P54 | FACTORY 1 | DISPLAY | DELIVERY |
| P55 | FACTORY 1 | PC | ASSEMBLY |
| P56 | FACTORY 1 | PC | INSPECTION |

| | PREVIOUS PROCESS ID | NEXT PROCESS ID | ESTIMATED TIME | GROUP ID |
|---|---|---|---|---|
| T1211 | P11 | P21 | 12 HOURS | |
| T1212 | P11 | P22 | 12 HOURS | |
| T1213 | P12 | P22 | 12 HOURS | |
| T1214 | P21 | P31 | 24 HOURS | |
| T1215 | P21 | P32 | 24 HOURS | |
| T1216 | P22 | P32 | 24 HOURS | |
| T1217 | P31 | P41 | 6 HOURS | |
| T1218 | P32 | P41 | 6 HOURS | |
| T1219 | P32 | P42 | 6 HOURS | |
| T1220 | P51 | P52 | 1 WEEK | |
| T1221 | P53 | P54 | 1 WEEK | |
| T1222 | P52 | P55 | 30 MINUTES | GROUP G1 |
| T1223 | P54 | P55 | 30 MINUTES | GROUP G1 |
| T1224 | P55 | P56 | 30 MINUTES | |

| | PRODUCT ITEM ID | TYPE OF PRODUCT ITEM |
|---|---|---|
| T1711 | PC1 | PC |
| T1712 | PC2 | PC |
| T1713 | PROCESSING UNIT 2 | PROCESSING UNIT |
| T1714 | DISPLAY 2 | DISPLAY |

| HISTORY RECORD ID | WORK DATE / TIME | WORK PLACE | PRODUCT ITEM ID | TYPE OF WORK | PROCESS ID |
|---|---|---|---|---|---|
| H11 | 12/01 10:00 | FACTORY 1 | PC1 | SHIPMENT | PROCESS P11 |
| H21 | 12/02 10:00 | WAREHOUSE 1 | PC1 | INSPECTION | PROCESS P21 |
| H41 | 12/03 16:00 | SHOP 1 | PC1 | RECEIPT | PROCESS P41 |
| H31 | 12/03 11:00 | CENTER 1 | PC1 | INSPECTION | PROCESS P31 |
| H51 | 12/01 10:00 | FACTORY 1 | PROCESSING UNIT 2 | WAREHOUSING | PROCESS P51 |
| H52 | 12/02 10:00 | FACTORY 1 | PROCESSING UNIT 2 | DELIVERY | PROCESS P52 |
| H53 | 12/01 13:00 | FACTORY 1 | DISPLAY 2 | WAREHOUSING | PROCESS P53 |
| H54 | 12/02 10:00 | FACTORY 1 | DISPLAY 2 | DELIVERY | PROCESS P54 |
| H55 | 12/02 10:30 | FACTORY 1 | PC2 | ASSEMBLY | PROCESS P55 |
| H56 | 12/02 11:00 | FACTORY 1 | PC2 | INSPECTION | PROCESS P56 |

FIG. 7 (a)

| HISTORY RECORD ID | WORK DATE / TIME | WORK PLACE | PRODUCT ITEM ID | TYPE OF WORK | PROCESS ID |
|---|---|---|---|---|---|
| H11 | 12/01 10:00 | FACTORY 1 | PC1 | SHIPMENT | PROCESS P11 |
| H21 | 12/02 10:00 | WAREHOUSE 1 | PC1 | INSPECTION | PROCESS P21 |

FIG. 7 (b)

| HISTORY RECORD ID | WORK DATE / TIME | WORK PLACE | PRODUCT ITEM ID | TYPE OF WORK | PROCESS ID |
|---|---|---|---|---|---|
| H11 | 12/01 10:00 | FACTORY 1 | PC1 | SHIPMENT | PROCESS P11 |
| H21 | 12/02 10:00 | WAREHOUSE 1 | PC1 | INSPECTION | PROCESS P21 |
| H41 | 12/03 16:00 | SHOP 1 | PC1 | RECEIPT | PROCESS P41 |

FIG. 7 (c)

| HISTORY RECORD ID | WORK DATE / TIME | WORK PLACE | PRODUCT ITEM ID | TYPE OF WORK | PROCESS ID |
|---|---|---|---|---|---|
| H11 | 12/01 10:00 | FACTORY 1 | PC1 | SHIPMENT | PROCESS P11 |
| H21 | 12/02 10:00 | WAREHOUSE 1 | PC1 | INSPECTION | PROCESS P21 |
| H41 | 12/03 16:00 | SHOP 1 | PC1 | RECEIPT | PROCESS P41 |
| H31 | 12/03 11:00 | CENTER 1 | PC1 | INSPECTION | PROCESS P31 |

| PREVIOUS HISTORY RECORD ID | NEXT HISTORY RECORD ID |
|---|---|
| H11 | H21 |
| H21 | Pending |

| PREVIOUS HISTORY RECORD ID | NEXT HISTORY RECORD ID |
|---|---|
| H11 | H21 |
| H21 | Pending |
| Pending | H41 |

| PREVIOUS HISTORY RECORD ID | NEXT HISTORY RECORD ID |
|---|---|
| H11 | H21 |
| H21 | H31 |
| H31 | H41 |

T1411, T1412, T1413

T1500

| HISTORY RECORD ID | ESTIMATED WORK DATE / TIME | WORK PLACE | PRODUCT ITEM ID | TYPE OF WORK | PROCESS ID |
|---|---|---|---|---|---|
| HX31 | 12/03 10:00-12:00 | CENTER 1 | PC1 | INSPECTION | PROCESS P31 |
| HX32 | 12/03 10:00-12:00 | CENTER 2 | PC1 | INSPECTION | PROCESS P32 |

T1600

| | PREVIOUS HISTORY RECORD ID | NEXT HISTORY RECORD ID |
|---|---|---|
| T1611 | H21 | HX31 |
| T1612 | HX31 | H41 |
| T1613 | H21 | HX32 |
| T1614 | HX32 | H41 |

FIG. 18 (a)

| HISTORY RECORD ID | WORK DATE / TIME | WORK PLACE | PRODUCT ITEM ID | TYPE OF WORK | PROCESS ID |
|---|---|---|---|---|---|
| H51 | 12/01 10:00 | FACTORY 1 | PROCESSING UNIT 2 | WAREHOUSING | PROCESS P51 |
| H53 | 12/01 13:00 | FACTORY 1 | DISPLAY 2 | WAREHOUSING | PROCESS P53 |

FIG. 18 (b)

| HISTORY RECORD ID | WORK DATE / TIME | WORK PLACE | PRODUCT ITEM ID | TYPE OF WORK | PROCESS ID |
|---|---|---|---|---|---|
| H51 | 12/01 10:00 | FACTORY 1 | PROCESSING UNIT 2 | WAREHOUSING | PROCESS P51 |
| H53 | 12/01 13:00 | FACTORY 1 | DISPLAY 2 | WAREHOUSING | PROCESS P53 |
| H55 | 12/02 10:30 | FACTORY 1 | PC2 | ASSEMBLY | PROCESS P55 |

FIG. 18 (c)

| HISTORY RECORD ID | WORK DATE / TIME | WORK PLACE | PRODUCT ITEM ID | TYPE OF WORK | PROCESS ID |
|---|---|---|---|---|---|
| H51 | 12/01 10:00 | FACTORY 1 | PROCESSING UNIT 2 | WAREHOUSING | PROCESS P51 |
| H53 | 12/01 13:00 | FACTORY 1 | DISPLAY 2 | WAREHOUSING | PROCESS P53 |
| H55 | 12/02 10:30 | FACTORY 1 | PC2 | ASSEMBLY | PROCESS P55 |
| H52 | 12/02 10:00 | FACTORY 1 | PROCESSING UNIT 2 | DELIVERY | PROCESS P52 |

FIG. 18 (d)

| HISTORY RECORD ID | WORK DATE / TIME | WORK PLACE | PRODUCT ITEM ID | TYPE OF WORK | PROCESS ID |
|---|---|---|---|---|---|
| H51 | 12/01 10:00 | FACTORY 1 | PROCESSING UNIT 2 | WAREHOUSING | PROCESS P51 |
| H53 | 12/01 13:00 | FACTORY 1 | DISPLAY 2 | WAREHOUSING | PROCESS P53 |
| H55 | 12/02 10:30 | FACTORY 1 | PC2 | ASSEMBLY | PROCESS P55 |
| H52 | 12/02 10:00 | FACTORY 1 | PROCESSING UNIT 2 | DELIVERY | PROCESS P52 |
| H54 | 12/02 10:00 | FACTORY 1 | DISPLAY 2 | DELIVERY | PROCESS P54 |
| H56 | 12/02 11:00 | FACTORY 1 | PC2 | INSPECTION | PROCESS P56 |

Figures 19A, 19B, 19C, 19D:
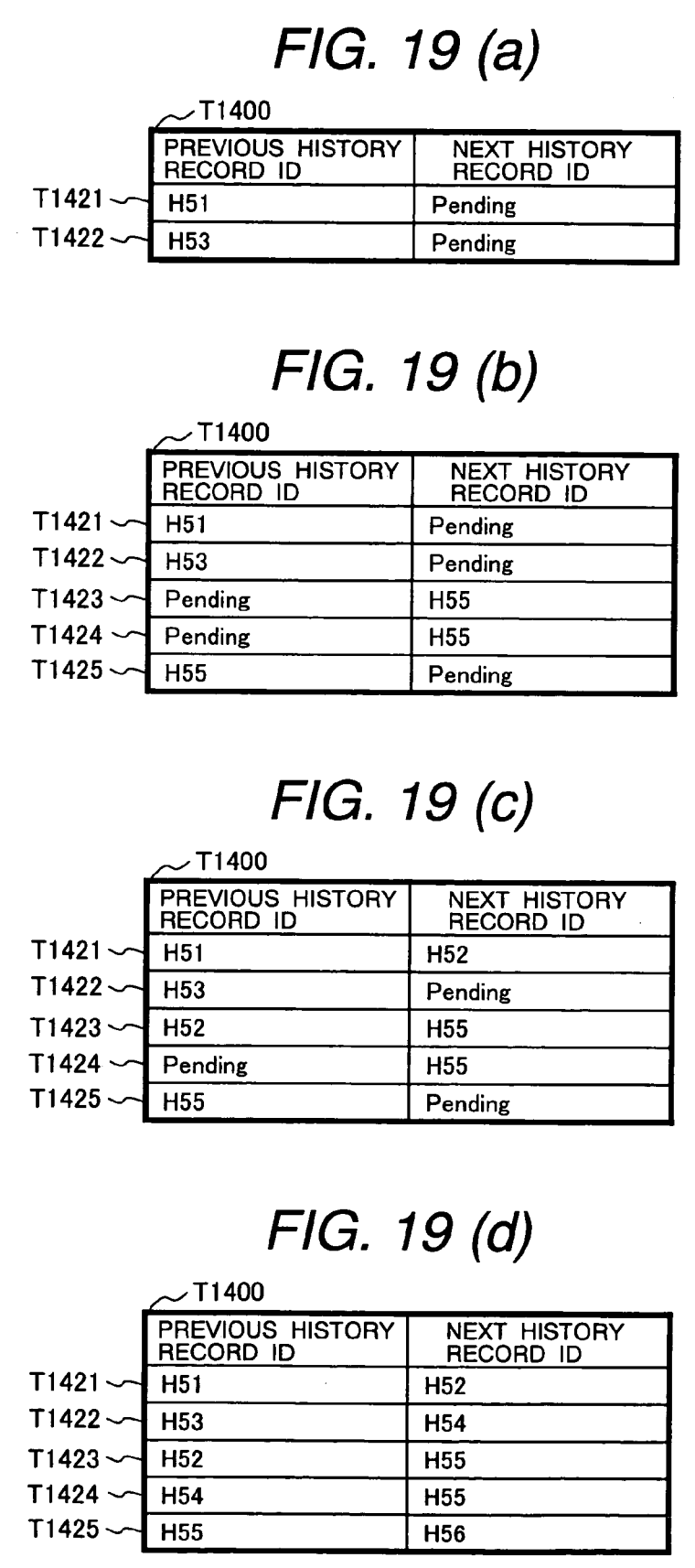

| PREVIOUS HISTORY RECORD ID | NEXT HISTORY RECORD ID |
|---|---|
| T1421 — H51 | Pending |
| T1422 — H53 | Pending |

| PREVIOUS HISTORY RECORD ID | NEXT HISTORY RECORD ID |
|---|---|
| T1421 — H51 | Pending |
| T1422 — H53 | Pending |
| T1423 — Pending | H55 |
| T1424 — Pending | H55 |
| T1425 — H55 | Pending |

| PREVIOUS HISTORY RECORD ID | NEXT HISTORY RECORD ID |
|---|---|
| T1421 — H51 | H52 |
| T1422 — H53 | Pending |
| T1423 — H52 | H55 |
| T1424 — Pending | H55 |
| T1425 — H55 | Pending |

| PREVIOUS HISTORY RECORD ID | NEXT HISTORY RECORD ID |
|---|---|
| T1421 — H51 | H52 |
| T1422 — H53 | H54 |
| T1423 — H52 | H55 |
| T1424 — H54 | H55 |
| T1425 — H55 | H56 |

T1500

| HISTORY RECORD ID | WORK DATE / TIME | WORK PLACE | PRODUCT ITEM ID | TYPE OF WORK | PROCESS ID |
|---|---|---|---|---|---|
| HX54 | 12/02 10:00-10:30 | FACTORY 1 | DISPLAY 2 | DELIVERY | PROCESS P54 |

T1600

| PREVIOUS HISTORY RECORD ID | NEXT HISTORY RECORD ID |
|---|---|
| T1621 — H53 | HX54 |
| T1622 — HX54 | H55 |

Figures 23A, 23B, 23C, 23D:
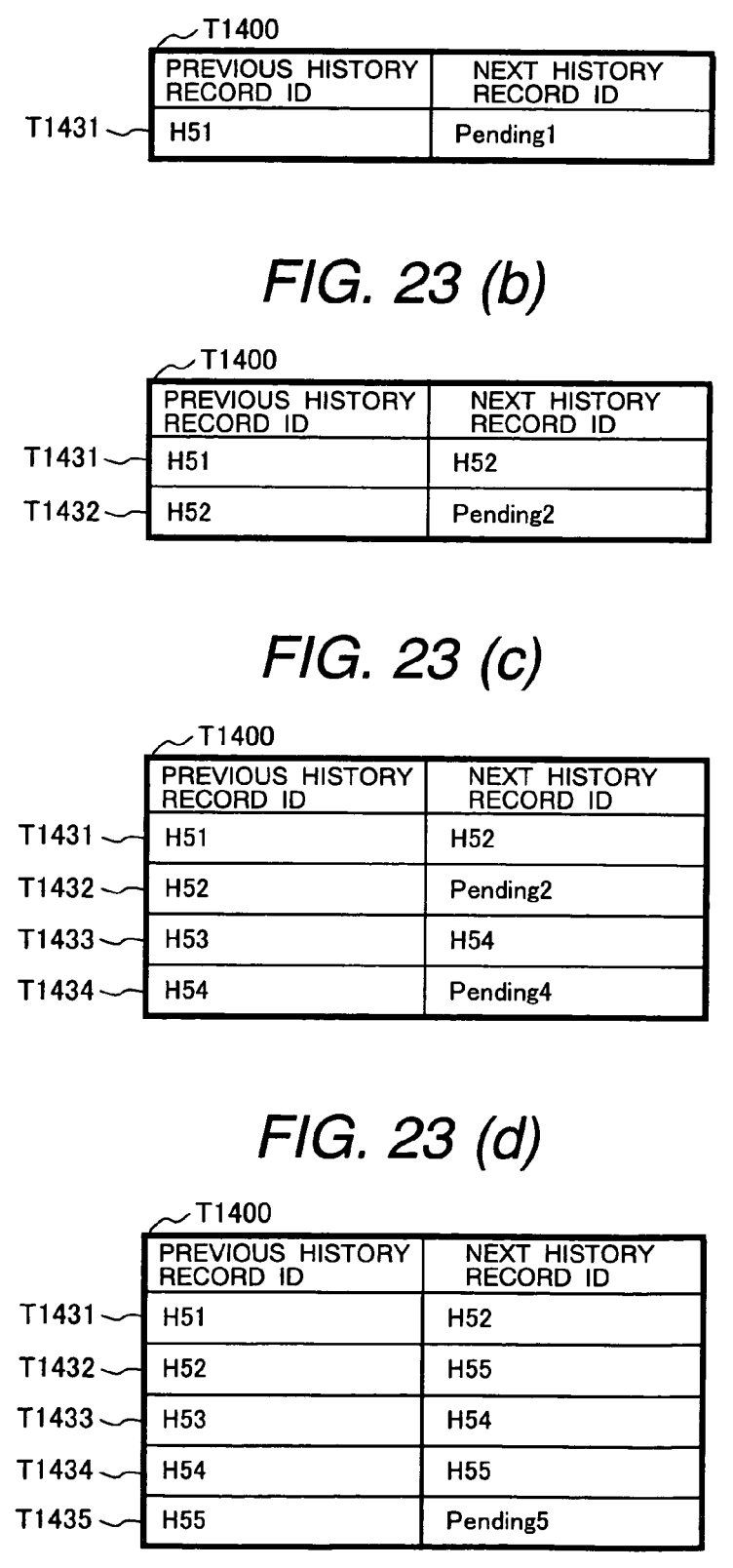

| PREVIOUS HISTORY RECORD ID | NEXT HISTORY RECORD ID |
|---|---|
| H51 | Pending1 |

| PREVIOUS HISTORY RECORD ID | NEXT HISTORY RECORD ID |
|---|---|
| H51 | H52 |
| H52 | Pending2 |

| PREVIOUS HISTORY RECORD ID | NEXT HISTORY RECORD ID |
|---|---|
| H51 | H52 |
| H52 | Pending2 |
| H53 | H54 |
| H54 | Pending4 |

| PREVIOUS HISTORY RECORD ID | NEXT HISTORY RECORD ID |
|---|---|
| H51 | H52 |
| H52 | H55 |
| H53 | H54 |
| H54 | H55 |
| H55 | Pending5 |

T1431, T1432, T1433, T1434, T1435

PROCESS CONTROL SYSTEM AND PROCESS CONTROL METHOD

BACKGROUND OF THE INVENTION

The present invention relates to a process control system and a process control method. More specifically, the invention relates to a process control system that controls manufacturing and distribution processes of manufactured product items and that is suitable for collecting and structuring history records for manufacturing and distribution processes and searching and outputting traceability information.

Conventionally, control of history records for manufacturing processes has been emphasized in order to improve the quality of manufactured product items. More specifically, the security and quality of product items are guaranteed by providing traceability information such as information indicating what a product item (hereinafter, an item involved in manufacturing and distribution is referred to merely as a "product item") is made of (or made from), information indicating which route(s) a product item has passed through, information indicating what method(s) a product item has been treated by. In addition, if a problem arises with respect to a product item, such traceability information would be useful.

A system for controlling history records for manufacturing processes using a computer system is described in the U.S. Pat. No. 3060984. In this patent document, when registering history record information, a previous process is identified by referring to a manufacturing process definition table and a history number for the present process is registered in the process control table of the previous process. After the history record information is stored, history records in the process control table are coupled together in the order of the processes, and a process history record table is generated and output. If the process history record table is viewed, it is possible to easily identify history records for manufacturing processes on the basis of each product.

In the abovementioned conventional technique, a process control table is defined for each product, and process history record tables coupled based on process batch numbers are generated based on the process control information.

However, with respect to controlling manufacturing processes, there are many cases where collection of history record information is not complete. For example, in some cases, history records may not registered completely for the reason that time required to complete registration of history records is varied depending on the processes, or some history records may be lacking. In those situations, the history records may not be structured, or may be placed without necessary history records as if the lacking history records did not originally exist. Controlling the history records for the processes cannot be sufficiently performed.

The present invention was made to solve the abovementioned problems of the conventional technique, and an object of the present invention is to provide a process control system which is user-friendly and facilitates to control history records by improving traceability of the history records related to manufactured product items through estimation of manufacturing history records even when collection of history record information is not complete.

SUMMARY OF THE INVENTION

In the process control system according to the present invention, for each type of product items, a process table in which to define processes of the product items and a process relationship table in which to define the order of processes are prepared. The following tables are prepared for a product item ID which identifies the product item: a history record table in which to define history record information of manufacturing and distribution for a product item; and a history record relationship table in which to define the order of work operations that is indicated in history record information consisting of a pair of a previous history and a next history. Based on the process tables and process relationship tables, information is set in the history record table and the history record relationship table according to the input history record information. Further, the system is arranged such that history records can be output in the order of work operations by searching the product item IDs.

In addition, with a monitor program, an alert can be output or a specified action is executed at a predetermined time based on time information of work operation time and a process for history records pending to be set in the history record relationship table.

For the history records pending to be set in the history record relationship table, the history records are estimated. In the case of history records for which a work operation is estimated to have been actually performed, the history records can be output in the order of the work operations.

With such arrangement, by using history records and history record relationship records, it is possible to obtain information indicating what a product item is made of (or made from), information indicating which route(s) a product item has passed through, information indicating what method(s) a product item has been treated by, etc., which easily realize traceability.

It is possible to create history record relationship records even if the order of collected history record information is not in the order of the processes. Furthermore, it is possible not only to create a history record relationship record each time history record information is obtained, but also to create history record relationship records with a batch method or the like in appropriate timing by collecting history record information. Thus, history records can be controlled even with a system that is not capable of real-time registration of history records.

In addition, it is possible to detect a process for which the work operation has been completed but no history record information is obtained. When history record information is not obtained for a certain period of time, it is possible to issue an alert. Furthermore, when part of history record information is not obtained or history record information disappears due to a failure, manufacturing and distribution route data for product items can be narrowed down through estimation.

BRIEF DESCRIPTION OF DRAWINGS

FIG. 3 is a diagram illustrating an example of a process table T1100.

FIG. 4 is a diagram illustrating an example of a process relationship table T1200.

FIG. 5 is a diagram illustrating an example of a Product Item attribute table T1700.

FIG. 6 is a diagram illustrating an example of a history record table T1300.

FIGS. 7A, 7B and 7C are diagrams illustrating phases of generating the history record table T1300 according to a first embodiment of the present invention.

FIGS. 8A, 8B and 8C are diagrams illustrating an example of a history record relationship table T1400 according to the first embodiment of the present invention.

FIGS. 18A, 18B, 18C and 18D are diagrams illustrating phases of generating the history record relationship table T1400 according to a third embodiment of the present invention.

FIGS. 19A, 19B, 19C, and 19D are diagrams illustrating an example of the history record relationship table T1400 according to the third embodiment of the present invention.

FIG. 23 is a diagram illustrating phases of generating the history record table T1300 according to a fifth embodiment of the present invention.

DESCRIPTION OF THE PREFERRED EMBODIMENTS

Hereinafter, each embodiment according to the present invention will be described with reference to FIGS. 1 to 24.

[System Configuration]

First, a system configuration of the process control system according to the present invention will be described with reference to FIG. 1.

Figure 1:
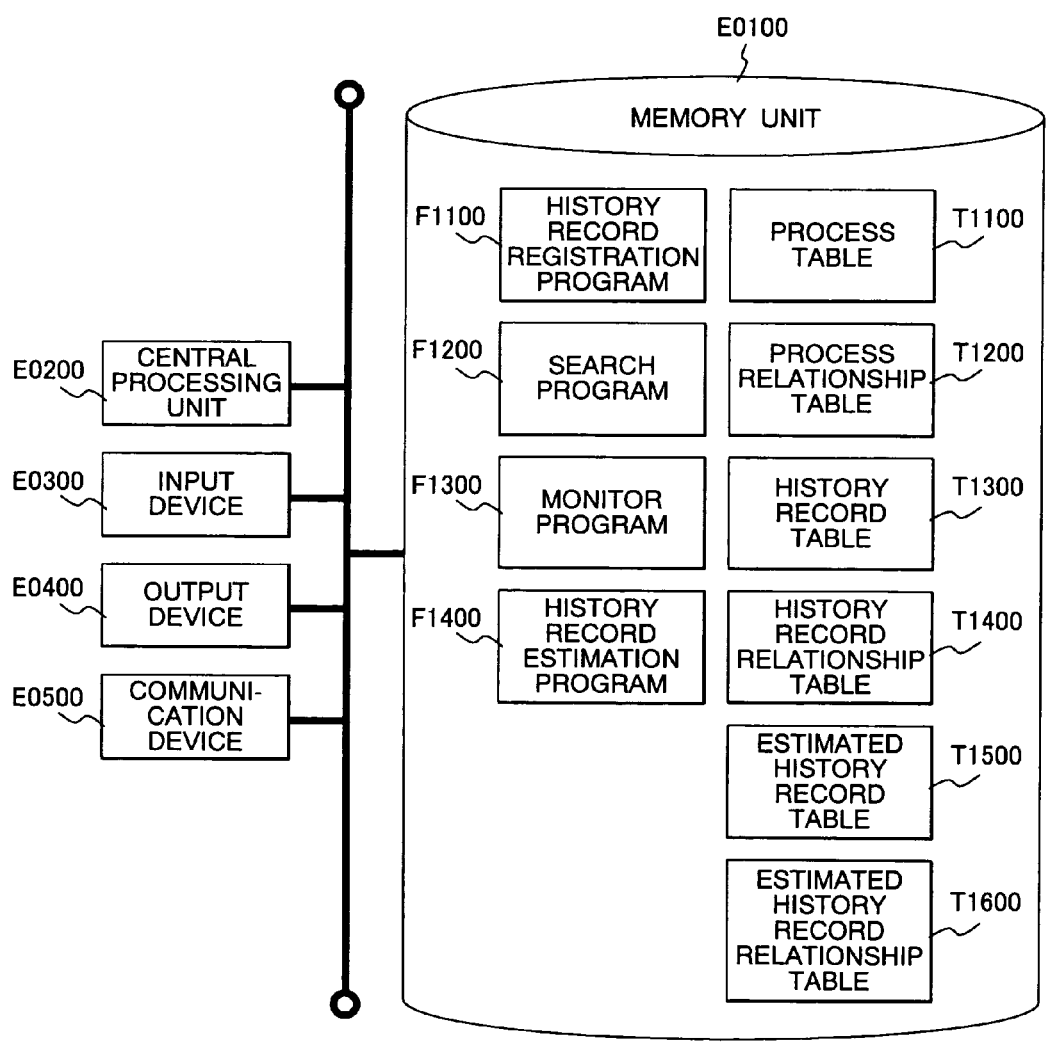
FIG. 1 is a system configuration diagram of a process control system according to the present invention.
Figure 2:
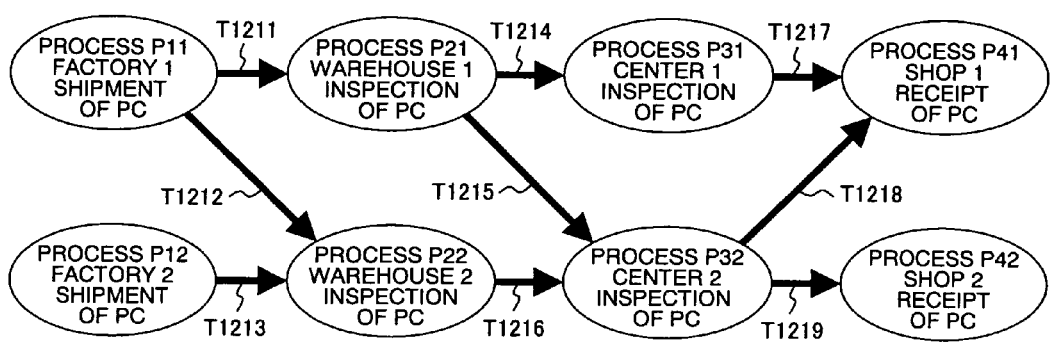
FIGS. 2A and 2B are process diagrams illustrating process models of manufacturing and distribution of PCs.
Figure 2:
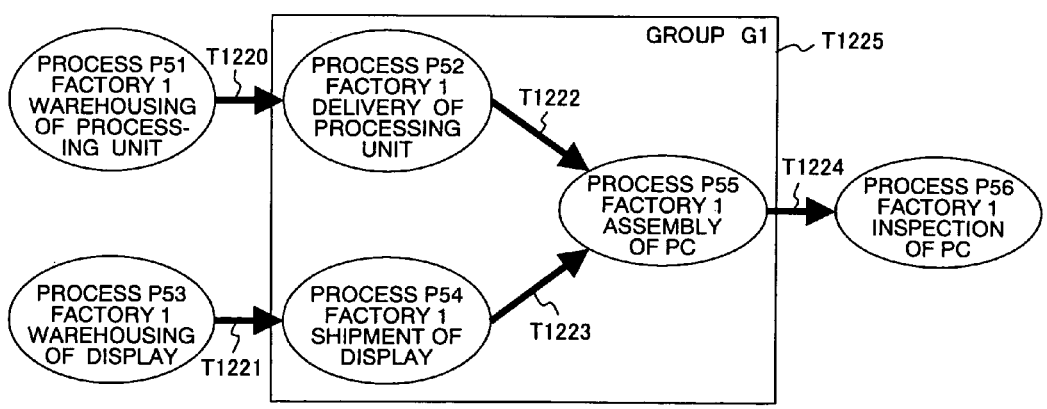

FIG. 1 is a system configuration diagram of a process control system according to the present invention.

The system of the present invention is configured in such a manner that a memory unit E0100 such as a hard disk, a central processing unit E0200 such as a CPU, an input device E0300 such as a keyboard, a barcode reader and an RFID (Radio Frequency Identification) reader, an output device E0400 such as a liquid crystal display and a printer, and a communication device E0500 such as Ethernet (registered trademark) are connected through a bus.

In the memory unit E0100, a process table T100, a process relationship table T1200, a history record table T1300, a history record relationship table T1400, an estimated history record table T1500, an estimated history record relationship table T1600, a history record registration program F1100, a search program F1200, a monitor program F1300 and a history record estimation program F1400 are stored.

In the process table T1100, work operation processes and contents of work operations are defined.

In the process relationship table T1200, relationships among processes that are registered in the process table T1100 are defined. Based on the process relationships, the order in which the processes are performed is defined.

The history record table T1300 includes work operation history records associated with processes registered in the process table T1100.

The history record relationship table T1400 includes history record relationship information that is registered in the history record table T1300. It is possible to view operation order, etc. of history records based on history record relationship records.

The estimated history record table T1500 includes results after history records that are currently on hold and have not been registered yet are estimated.

The estimated history record relationship table T1600 includes history record relationship information between history records in the history record table T1300 and history records in the estimated history record table T1500.

The history record registration program F1100 registers history record information obtained through the input device E0300 and the communication device E0500 in the history record table T1300. In addition, using the process table T1100 and the process relationship table T1200, history record relationship information among history records that are registered in the history record table T1300 is created and registered in the history record relationship table T1400.

The search program F1200 searches history records under search conditions that are input from the input device E0300 and the communication device E0500 by using the history record table T1300, the history record relationship table T1400, the estimated history record table T1500 and the estimated history record relationship table T1600 and structures and places the history records based on history record relationships. The search results are output from the output device E0400 or the communication device E0500.

The monitor program F1300 monitors the history record table T1300 and the history record relationship table T1400. If a history record is not registered for a certain period of time or more, the monitor program F1300 executes predefined processing such as issuing an alert and starting up the history record estimation program F1400 to estimate history records.

The history record estimation program F1400 estimates history record information that are on hold in the history record relationship table T1400 using the process table T1100, the process relationship table T1200, the history record table T1300 and the history record relationship table T1400. The estimated history records are registered in the estimated history record table T1500, and the estimated history records and the relationship information of the history records are registered in the estimated history record relationship table T1600.

First Embodiment

Hereinafter, the first embodiment according to the present invention will be described with reference to FIGS. 2 to 10.

FIGS. 2A and 2B are process diagrams illustrating process models of manufacturing and distribution of PCs.

FIG. 3 is a diagram illustrating an example of a process table T1100.

FIG. 4 is a diagram illustrating an example of a process relationship table T1200.

FIG. 5 is a diagram illustrating an example of a Product Item attribute table T1700.

FIG. 6 is a diagram illustrating an example of a history record table T1300.

FIGS. 7A, 7B and 7C are diagrams illustrating phases of generating the history record table T1300 according to a first embodiment of the present invention.

FIGS. 8A, 8B and 8C are diagrams illustrating an example of a history record relationship table T1400 according to the first embodiment of the present invention.

Figure 9:
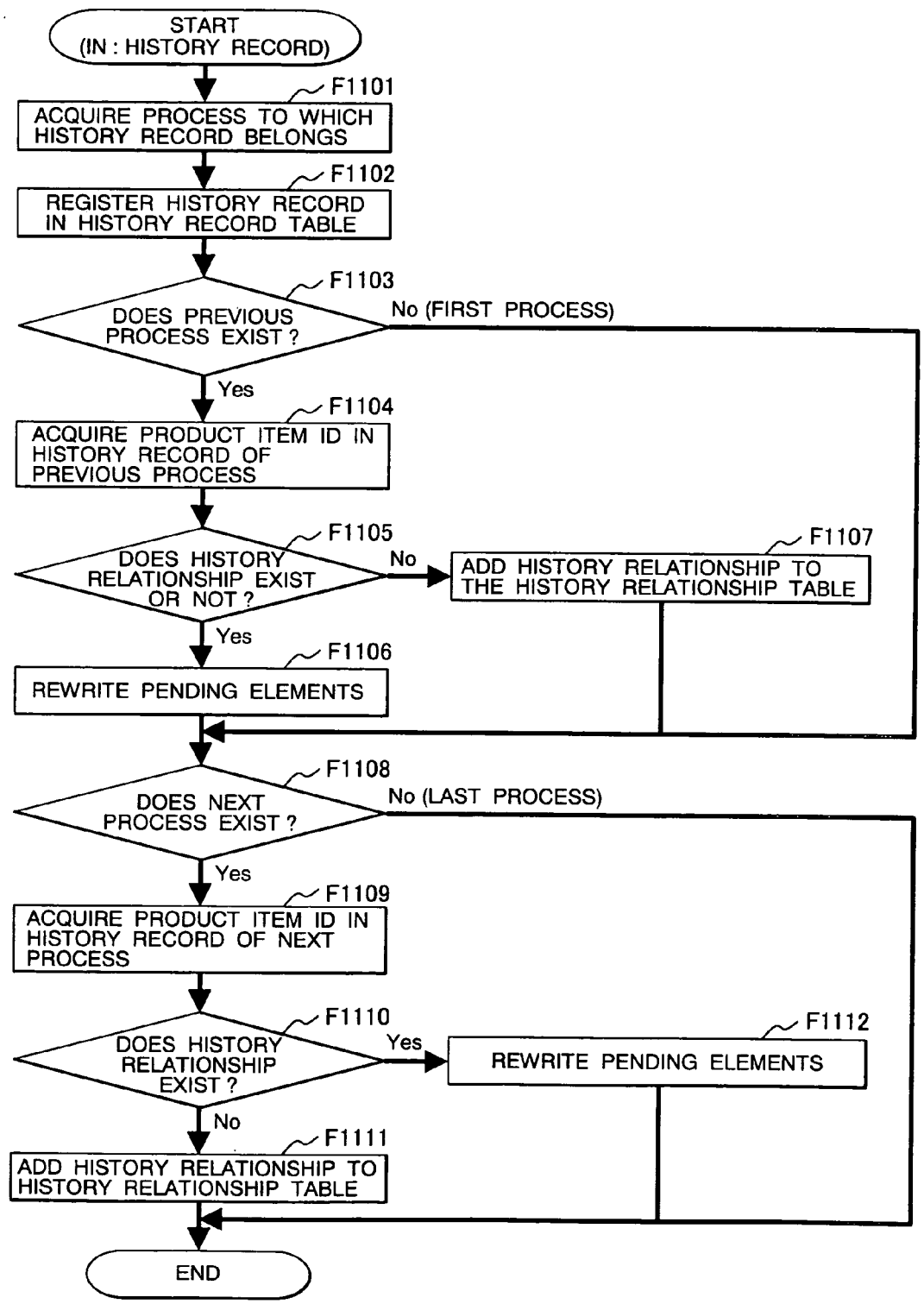
FIG. 9 is a flow chart illustrating the processing of a history record registration program F1100 according to the first embodiment of the present invention.

FIG. 9 is a flow chart illustrating the processing of a history record registration program F1100 according to the first embodiment of the present invention.

Figure 10:
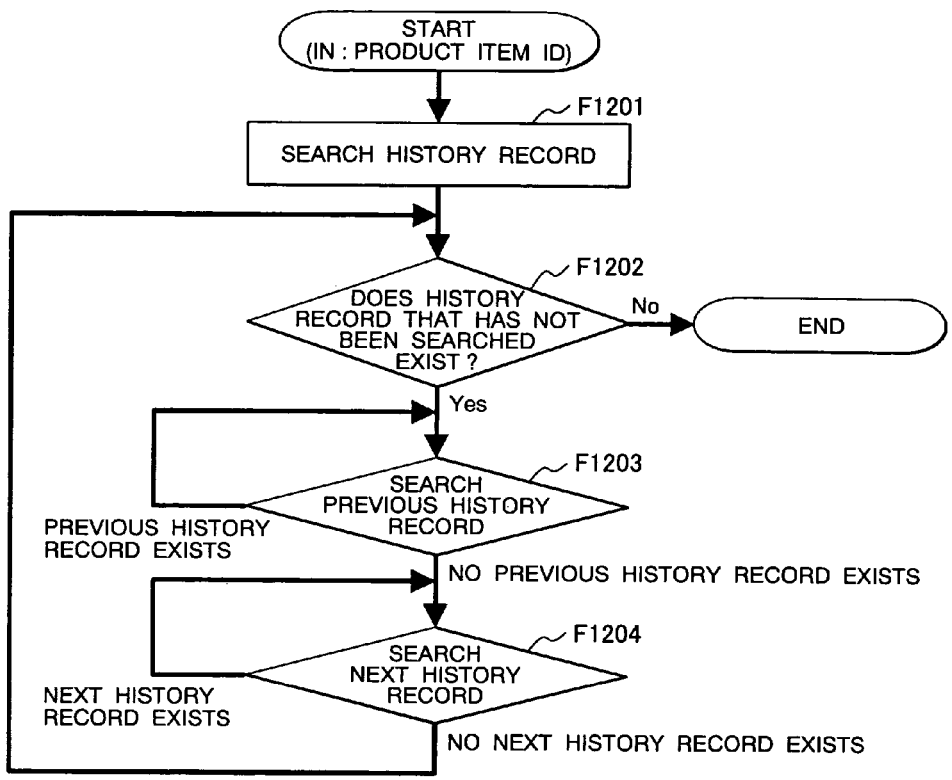
FIG. 10 is a flow chart showing the processing of a search program F1200.

FIG. 10 is a flow chart showing the processing of a search program F1200.

Figure 11:
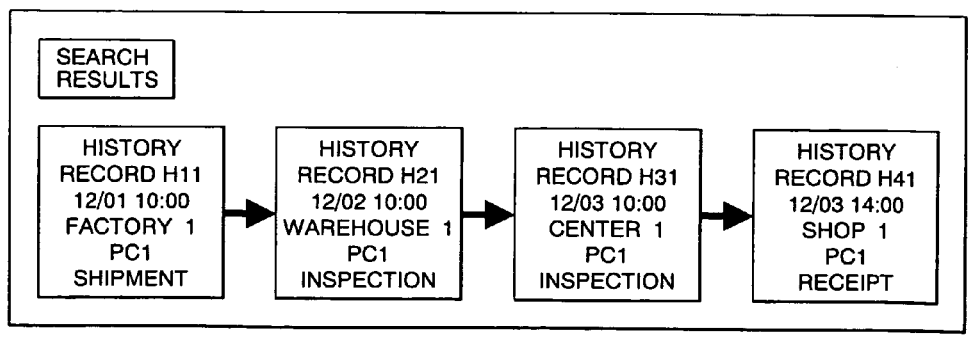
FIG. 11 is a diagram illustrating search results for history records output in the order of work operations according to the first embodiment of the present invention.

FIG. 11 is a diagram illustrating search results for history records output in the order of work operations according to the first embodiment of the present invention.

In the first embodiment, it is assumed that a product item is a PC, and an example in which history record information related to the product item is registered and history record relationships are created will be described. In the example, the history record information related to the product item may not be collected in the process order of the product item.

The PC used in the first embodiment is provided with a process model of manufacturing and distribution as shown in FIGS. 2A and 2B. FIG. 2A shows the distribution processes for the PC, and FIG. 2B shows the manufacturing processes for the PC. In FIGS. 2A and 2B, reference numerals P11 to P56 shows numbers to identify a process. For example, a process P11 shows a shipping process at a factory 1. In addition, arrows that connect between processes show the relationships among processes, and indicate the order in which the processes are performed. For example, a process relationship T1211, which is directed from process P11 to P21, shows that the PC is shipped from a factory 1 and is then inspected at a warehouse 1.

Diverging from the process P11 in FIG. 2A, there are two process relationships. The process relationship T1211 is directed to the process P21 and a process relationship T1212 is directed to the process P22. This shows that there are two potential paths. A certain PC is sent to a warehouse 1 and another PC is sent to a warehouse 2. The area enclosed with a frame T1225 in FIG. 2B shows that a process relationship T1222 and a process relationship T1223 are in a group. The arrows in the group do not mean that there are a plurality of potential paths, but mean that all of a plurality of arrowed paths are necessary. More specifically, to assemble a PC in the process P55, both the process relationship T1222 and the process relationship T1223 are necessary. Through the process relationship T1222, a processing unit is delivered from the process P52. Through the process relationship T1223, a display is delivered from the process P54. Both the display and the processing unit are assembled in the process P55. The process model concerning a PC can be defined by the process table T1100 and the process relationship table T1200. The process table T1100 is shown in FIG. 3 that will be described below and the process relationship table T1200 is shown in FIG. 4.

As shown in FIG. 3, the process table T1100 includes items such as "Process ID" which uniquely identifies a process of all the processes, "Work Place" which indicates a site in which work is performed, "Type of Product item" which indicates the type of a product item for which work is performed, and "Type of Work" which indicates the type of work performed in the process concerned. The processes are defined such that the processes can be determined based on combination of items such as Work Place, Type of Product Item, and Type of Work. For example, the process P11 shows a shipping process in which a PC is shipped at a factory 1. It is necessary that data be registered in advance in the process table T1100 by a system user.

On the other hand, as shown in FIG. 4, the process relationship table T1200 includes items such as "Previous Process ID", "Next Process ID", "Estimated Time", and "Group ID". The Previous Process ID indicates the process before transition is performed. The Next Process ID indicates the process after transition is performed. The estimated time indicates the average period of time between the time when the transition is performed in the previous process and the time when the transition is performed to the next process. The group ID is used for grouping a plurality of process relationships. For example, in the record of the process relationship T1211, since the previous process is P11 and the next process is P21, the process P21 will be performed after the process P11. In addition, with the process relationship T1211 and the process relationship T1214, it can be defined that there is a process path flowing in the order of the process P11, the process P21 and the process P31. It should be noted that the estimated time may be in the range from 1 to 2 hours instead of 1 hour. It is necessary that a system user should register data in the process relationship table T1200 in advance.

As shown in FIG. 5, the product item attribute table T1700 includes items such as "Product Item ID" which uniquely identifies a product item among all the product items and "Type of Product Item" which indicates the type of a product item. For example, product item attribute information T1711 shows that the type of a product item whose Product Item ID is PC 1 is a PC. More specifically, Type of Product Item is a model number of the PC, and the Product Item ID is a serial number or a pallet ID which is given to a pallet that is subjected to transportation. In the product item attribute table T1700, data is registered by a system user in advance, or product item attribute information is registered when history records are first registered. Information in the product item attribute table T1700 is used as reference information when registering history record information.

As shown in FIG. 6, the history record table T1300 includes items such as "History Record ID" which uniquely identifies a history record among all the history records, "Work Date/Time" which indicates date and time when the work is performed, "Work Place" which indicates the place where the work is performed, "Product Item ID" which indicates a product item for which work is performed, "Type of Work" which indicates the type of work, and "Process ID" which indicates the process to which the work belongs. For example, a history record H11 indicates that "PC 1 has been shipped from a factory 1 at 10 o'clock on 12/1st" and that it belongs to the process P11. Although not shown in the figure, the history record table T1300 may include items such as "Worker ID" which indicates person(s) who perform the work. In the history record table T1300, a date is registered by the history record registration program F1100, which will be described later.

As shown in FIG. 8, the history record relationship table T1400 includes items such as "Previous history Record ID" which indicates a history record in the previous process before transition is performed and a "Next history Record ID" which indicates a history record in the next process after transition is performed. For example, a history record relationship T1411 shows that work in history record H21 has been performed after the work in history record H11 has been performed. In the history record table T1400, data is registered by the history record registration program F1100, which will be described later.

Next, processing of the history record registration program F1100 will be described with reference to FIG. 9.

The history record registration program F1100 starts up while using the history record information as an argument.

In the initial state, as shown in FIG. 7A, history records H11 and H21 are registered in the history record table T1300, and the history records H11 and H21 are registered in Previous History Record ID and Next History Record ID in the history record relationship table T1400, respectively.

First, when the history record registration program F1100 starts up, while using the history record information "Work Date/Time: 12/03 16:00, Work Place: Shop 1, Type of Work: Receipt, Product Item ID: PC 1, " as an argument. The processes will be as follows.

By using the product item attribute table T1700, a search is executed to find that the Type of a Product Item is PC since the Product Item ID is PC1. Then, another search is executed through the records of the process table T1100 to verify, after matching of the items of Type of Product Item, Work Place and Type of Work, that the process having the history record information "Product Item ID: PC1, Work Place: Shop 1, Type of Work: Receipt" is the process P41 (Step F1101). It should be noted that, when the process ID is passed to history record information of the argument, the process ID may be fetched directly from the history record information, without using the product item attribute table T1700 or the process table T1100.

Then, the history record registration program F1100 issues a history record ID, which uniquely identifies the history record among all the history records relative to the history record information. For example, a history record ID H41 is issued for history record information. The history record information including the history ID is then registered on the history record table T1300. Consequently, the history record H41 in FIG. 7B is created (Step F1103).

Then, in Steps 1103 to 1106, the history record relationship between the history record H41 and the previous process is created to register in the history record relationship table.

First, by using the process relationship table T1200, the previous process of the process P41 is searched. As a result, for a process relationship in which Previous Process ID is P41, two process relationships T1217 and T1218 are found. This means that a previous process exists. Note that, if no previous process exists, that is, if the process P41 is the first process related to manufacturing for the product item in the process P41, the step in which a history record relationship with the previous process history record is created will be skipped (Step F1103).

For the process relationship T1217 in which Previous Process ID is P31, Next Process ID is P41, a product item ID is obtained in the history record of the process P31 (Step F1104). The product item ID in the history record H41 is PC1, and the items in Type of Product Item in the processes P31 and P41 are not changed. Therefore, Product Item ID in the history record of the process P31 is estimated to be PC1.

In addition, for the process relationship T1218 in which Previous Process ID is P32, and Next Process ID is P41, a product ID is obtained in the history record of the process P32 (Step F1104). The product item ID in the history record H41 is PC1, and the items in Type of Product Item in the processes P32 and P41 are not changed. Therefore, Product Item ID in the history record of the process P32 is estimated to be PC1.

Based on Product Item ID and Process ID, it is possible to identify a history record. Now, a history record relationship associated with the process relationship T1217 is searched. By using the history record table T1300, a history record, in which Product Item ID is PC1 and Process ID is P31, is searched. However, such a history record is not found in the history record table T1300 in FIG. 7B. Therefore, it is understood that no history record relationship associated with the process relation T1217 has been registered. Next, a history record relationship associated with the process relationship T1218 is searched. By using the history record table T1300, a history record in which Product Item ID is PC1 and Process ID is P32 is searched. However, such a history record is not found in the history record table T1300 in FIG. 7B. Therefore, it is understood that no history record relationship associated with the process relationship T1218 has been registered. From the above, it is understood that there is no history record relationship that is associated with the process relationships T1217 and T1218 (Step F1105).

As a result, by using a code for indicating that the previous process history record is pending, the history record relationship is tentatively registered in the history record relationship table T1400. Assuming that "Pending" is used for the code, a history record relationship in which Previous History Record ID is Pending and Next History Record ID is H41 will be created like a history record relationship T1413 in FIG. 8B, and the relationship will be added to the history record relationship table T1400 (Step F1106).

Next, in Step F1108, a history record relationship between the history record H41 and the previous process history is created.

First, by using the process relationship table T1200, search is executed for the previous process of the process P41, and the process relationship which should be "Previous Process ID: P 41" cannot be found. Therefore, a step for creating a history record relationship with the history record of the previous process will be skipped (Step F1108).

After the abovementioned processing, the history record H41 is registered and the history record relationship table T1400 will be the one shown in FIG. 8B.

Then, when the history record registration program F1100 starts while using the history record information "Work Day/Time: 12/03 11:00, Work Place: Center 1, Type of Work: Inspection, Product Item ID: PC 1" as an argument, the steps will be as follows:

From information that specifies processes among history record information, information indicating to which process a history record belongs is acquired. It is understood that the history record information belongs to the process P31 (Step F101).

The history record information is registered in the history record table T1300. As a result, the information will be like the history record H31 in the history record table T1300 shown in the history record table T1300 (Step F1102).

Then, in Steps F1103 to 1106, a history record relationship between the history record H31 and the previous process history is created.

First, by using the process relationship table T1200, the previous process of the process P31 is searched, and the process relationship T1214 is found as a process relationship which should be "Previous Process ID: P 31 " (Step F1103). This means that a previous process exists.

For the process relationship T1214, "Previous Process ID: P 21, Next Process ID: P 31 ", a Product Item ID is acquired in the history record of the process P21 (Step F1104). The Product Item ID in the history record H31 is PC1, and no change has been made in items in Type of Product Item in processes P21 and P31. Therefore, it is estimated that the Product Item ID in the history record of the process P21 would be PC1.

Next, a history record relationship that is associated with the process relationship T1214 is searched. By using the history record table T1300, a history record which should be "Product Item ID: PC 1, Process ID: P 21 " is searched. Then, the history record H21 is found. By using the history record relationship table T1400, a history record in which Previous History Record ID is H21 is searched, and the history record relationship T1412 in FIG. 8B is found (Step F1105).

Now it is understood that the subsequent history record of the history record in which Previous History Record ID is H21 is H31, and like the history record relationship T1412 in FIG. 7C, the Pending element is rewritten to the history record H31 (Step F1106).

Next, in Steps F1108 to 1112, the history record relationship with the history record of the next process is created.

By using the process relationship table T1200, the next process of the process P31 is searched, and the process relationship T1217 is found among records with "Previous Process ID: P 31. " This means that a next process exists (Step F1108).

Concerning the process relationship T1217 "Previous Process ID: P 31, Next Process ID: P 41 ", a Product Item ID in the history record of the process P41 is acquired (Step F1109). The Product Item ID in the history record H31 is PC1, and no change has been made in the Product Item type in processes P31 and P41. Therefore, it is estimated that the Product Item ID in the history record of the process P41 would be PC1.

Next, a history record relationship that is associated with the process relationship T1217 is searched. By using the history record table T1300, a history record in which Product Item ID is PC1 and Process ID is P41 is searched. Then, the history record H41 is found. By using the history record relationship table T1400, history records in which Previous History Record ID is H41 is searched, and the history record relationship T1413 in FIG. 7B is found (Step F110).

Now it is understood that the previous record of the record in which Next History Record ID is H41 is H31. Like the history record relationship T1413 in FIG. 7C, the Pending element is rewritten to the history record H31 (Step F1112).

After the abovementioned processing, the history record H31 is registered and the history record relationship table T1400 will be the one shown in FIG. 7C.

Next, processing for performing search while using a Product Item ID to be searched as an argument, and then processing for outputting history record information will be described with reference to FIG. 10.

When the search program F1200 is started while using "Product Item ID: PC 1 " as an argument, the steps will be as follows:

By using the history record table T1700, history records in which Product Item ID is PC1 are searched (Step F1201), and four history records H11, H21, H31 and H41 are found. First, one history record is chosen from the four history records. Here, it is assumed that the history record H31 is chosen.

Among the history records found in Step F1201, the history record H31 has not been searched yet (Step 1202).

Using the history record relationship table T1400, the history record relationship in which Previous History Record ID is H31 is searched (Step F1203), and the history record relationship T1412 in which Previous History Record ID is H21 and Next History Record ID is H31 is found.

Also, using the history record relationship table T1400, a history record in which Previous History Record ID is H21 is searched (Step F1203), and the history record relationship T1411, "Previous History Record ID: H 11, Next History Record ID: H 21 ", is found.

Using the history record relationship table T1400, a history record relationship in which Next History Record ID is H11 is searched (Step F1203). However, such a history record relationship cannot be found. Therefore, the history record H11 should be currently positioned at the top of the history records. By tracking previous history records, it is understood that the processes proceed in the order from history record H11, history record H21, to history record H31.

Next, Using the history record relationship table T1400, a history record relationship in which Previous History Record ID is H31 is searched (Step F1204), and the history record relationship T1413, "Previous History Record ID: H 31, Next History Record ID: H 41", is found.

Using the history record relationship table T1400, a history record relationship in which Previous History Record ID is H41 is searched. However, such a history record relationship cannot be found. In the same manner as described above, by tracking previous history records, it is understood that the processes proceed in the order from history record H31 to history record H41. (Step F1204).

When there is no history record that has not been searched among the history records found in Step F1201, the search processing is terminated (Step F1202).

After the abovementioned processing, it is understood that PC1 passes from history record H11 to history record H21, history record H31, and history record H41.

The search result after records related to PC1 are searched is output via an output device or a communication device shown in FIG. 11. Based on the output, it is possible to understand the processes performed for PC1 and routes used for PC1.

Second Embodiment

Hereinafter, a second embodiment according to the present invention will be described with reference to FIGS. 12 to 16.

In a process control system, history record information may not be immediately reflected, or there may be a time lag, or the information may not be updated due to a trouble. In this case, in the second embodiment, lacking history records are viewed after estimated based on set information of processes and process relationships.

Figures 12, 13, 14:
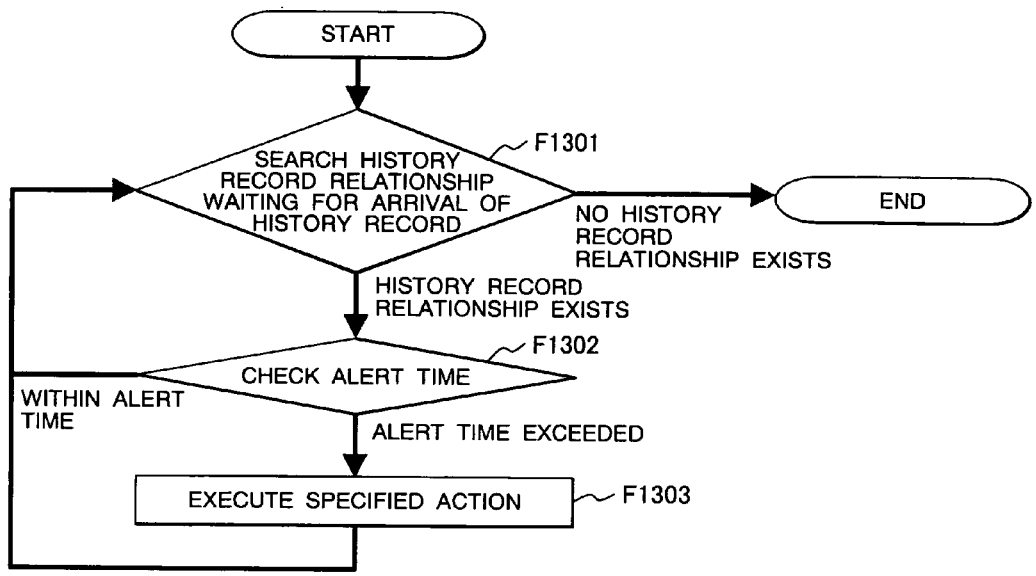
FIG. 12 is a flow chart illustrating the processing of a monitor program F1300.
FIG. 13 is a diagram illustrating an example of an estimated history record table T1500 according to a second embodiment of the present invention.
FIG. 14 is a diagram illustrating an example of an estimated history record relationship table T1600 according to the second embodiment of the present invention.

FIG. 12 is a flow chart illustrating the processing of a monitor program F1300.

FIG. 13 is a diagram illustrating an example of an estimated history record table T1500 according to a second embodiment of the present invention.

FIG. 14 is a diagram illustrating an example of an estimated history record relationship table T1600 according to the second embodiment of the present invention.

Figure 15A:
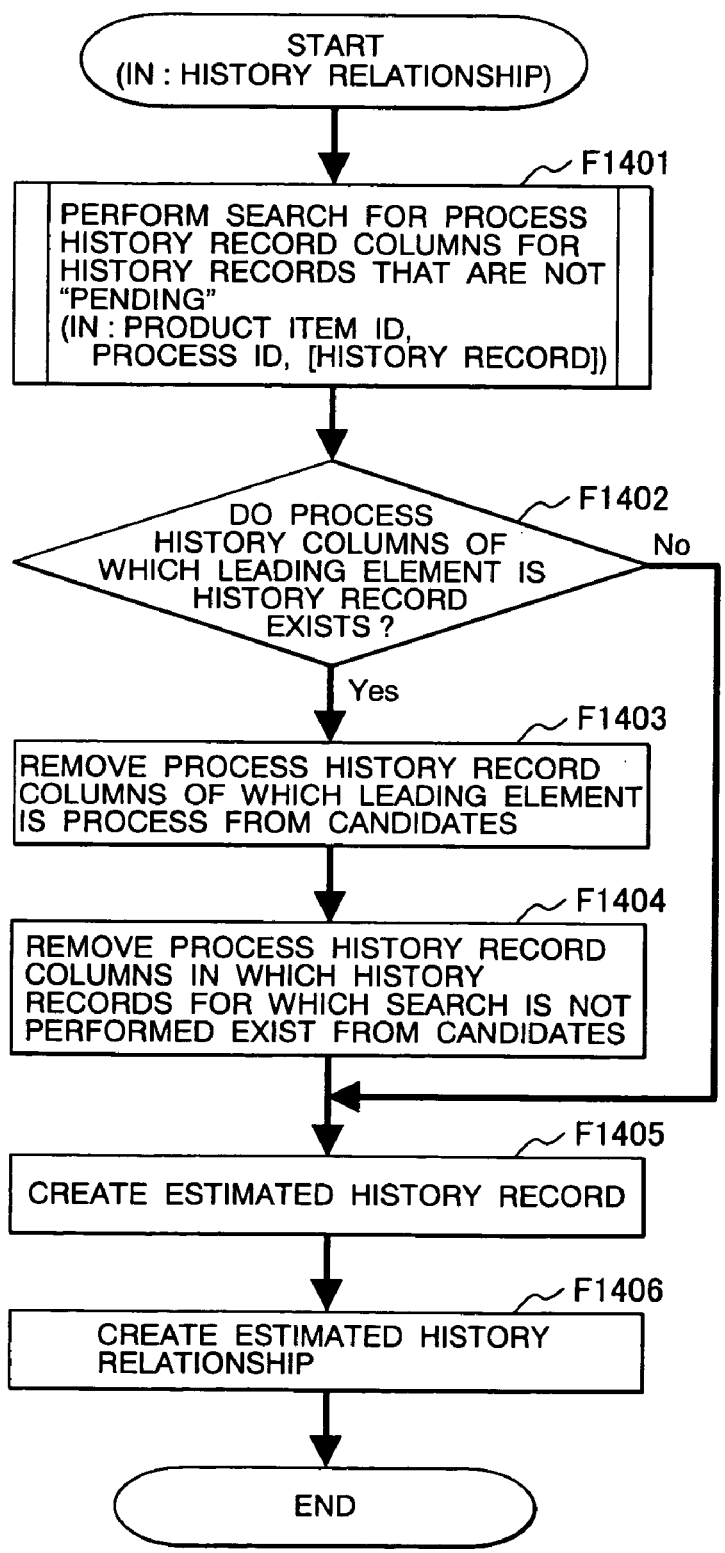
FIG. 15A is a flow chart illustrating the processing of a history record estimation program F1400.

FIG. 15A is a flow chart illustrating the processing of a history record estimation program F1400.

Figure 15B:
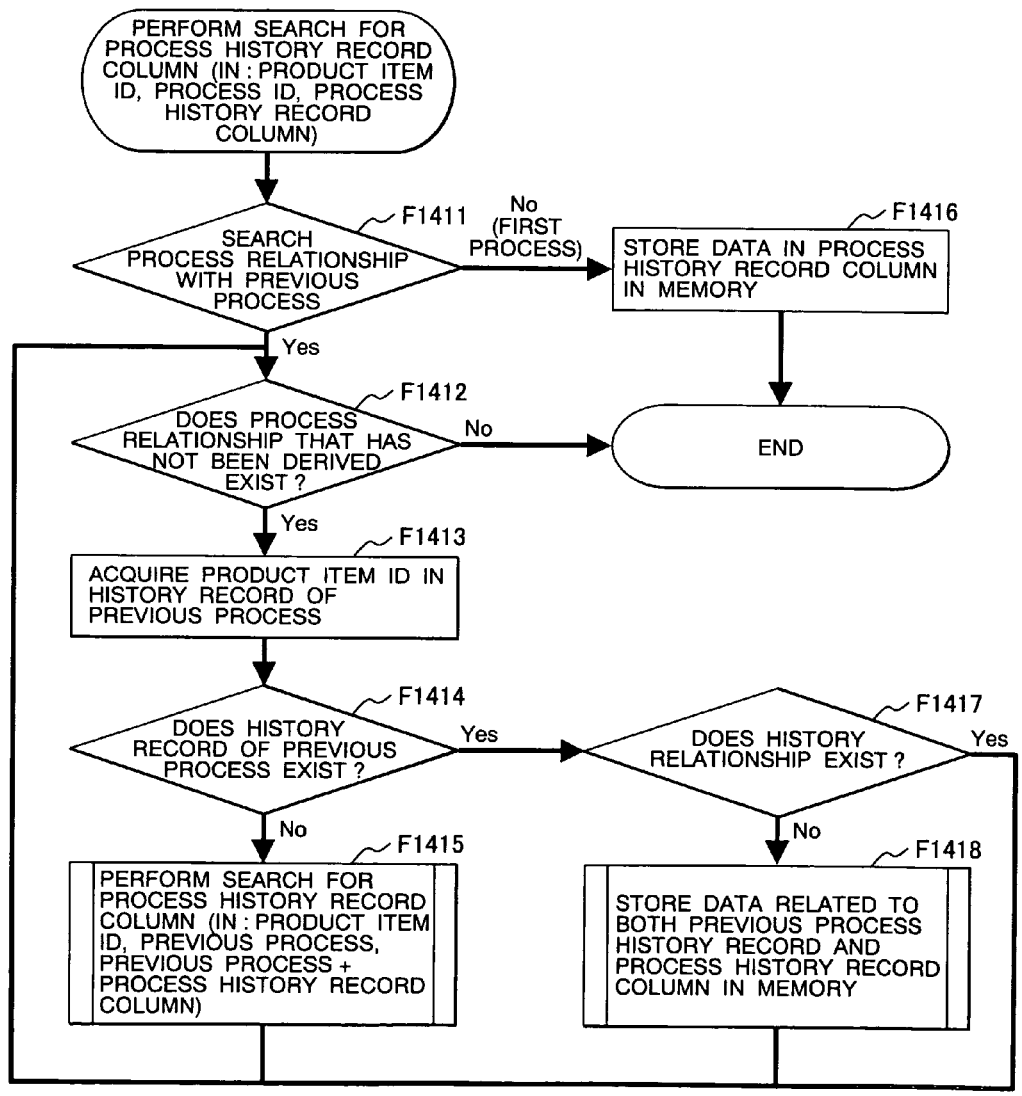
FIG. 15B is another flow chart illustrating the processing of the history record estimation program F1400.

FIG. 15B is another flow chart illustrating the processing of the history record estimation program F1400.

Figure 16:
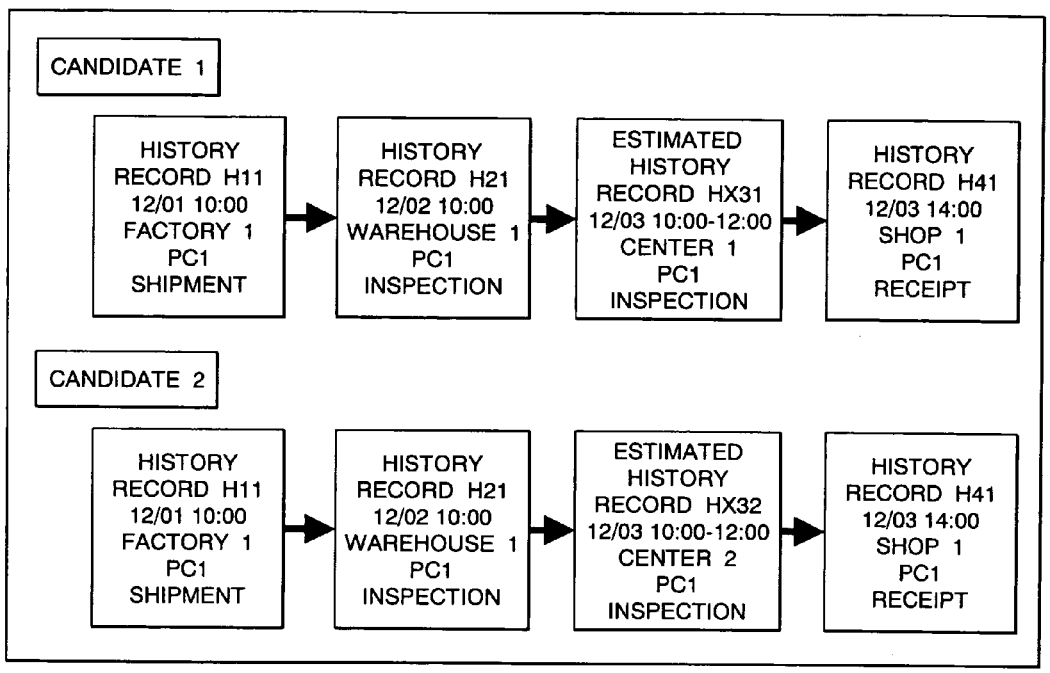
FIG. 16 shows an example of search results in the case where search is executed on PC 1 by using the search program F1200.

FIG. 16 shows an example of search results in the case where search is executed on PC 1 by using the search program F1200.

In the history record relationship table T1400 shown in FIG. 8, the status where the previous history record ID is Pending and there is a history record relationship in which a next history record is registered means that work in the previous history record has been completed, but the history record information in the previous history record has not been delivered to the system.

Under the status shown in FIG. 8B, that is, the status where the history records H11, H21 and H41 have been registered by the history record registration program F1100 and where the history record H31 has not been registered yet, the monitor program F1300 operates as follows:

Using the history record relationship table T1400, search is executed for a history record relationship in which Previous History Record ID is Pending (Step F1301), and the history record relationship T1413 is found.

The history record relationship T1413 can be described as "Previous History Record ID: Pending, Next History Record ID:H 41." It is confirmed whether the period of time from the time in the Work Day/Time in the history record H41 to the current time exceeds the alert time specified by the system (Step F1302). At this time, the item Work Day/Time of the history record table T1300 and the item Estimated Time of the process relationship table T1200 are referenced.

If the alert time has exceeded, actions that are predefined by the system, such as issuing an alert or starting up the history record estimation program F1400 while using the history record relationship T1413 as an argument, are executed (Step F1303).

Next, using the history record relationship table T1400, search is executed for another history record relationship in which Previous History Record ID is Pending. (Step F1301). When such a history record relationship is not found, the processing is terminated.

The monitor program F1300 periodically executes the abovementioned processing and executes actions for a history record relationship in which delivery time in the history record exceeds the alert time.

Hereinafter, procedures for estimating and outputting a history record for a certain Product Item ID as a predefined action will be described.

When estimating a history record, the estimated history record table T1500 and the estimated history record relationship table T1600 are used in addition to the tables that have been described in the above.

The estimated history record table T1500 includes items, as shown in FIG. 13, such as a "History Record ID" which uniquely identifies a history record among all the history records, a "Estimated Date/Time" which indicates an assumed range of date and time when the work was performed, a "Work Place" which indicates a site where the work was performed, a "Product Item Type" which indicates the type of Product Item for which work is to be performed, a "Type of Work" which indicates the type of work that is performed in the process, and a "Process ID" which indicates a process to which the work belongs. For example, the estimated history record HX31 shows: "It is assumed that there is a history record indicating that inspection work was performed for PC 1 at Center 1, and it is also assumed that the work was performed during the time period from 10:00 on 12/3rd to 12:00 on 12/3rd." The estimated history record table T1500 may be the same table as the history record table T1300 if history records and estimated history records can be discriminated by providing items such as Type. In the estimated history record table T1500, data is registered using the history record estimation program F1400, which will be described later.

The estimated history record relationship table T1600 includes items, as shown in FIG. 14, such as a "Previous History Record ID" which indicates a history record before transition is performed in the previous process and a "Next History Record ID" which indicates a history record after transition is performed to the next process.

The estimated history record relationship table T1600 may be the same table as the history record table T1300 if history records and estimated history records can be discriminated by providing items such as Type. In the estimated history record relationship table T1600, data is registered using the history record estimation program F1400, which will be described later.

Next, processing of the history record estimation program F1400 will be described with reference to FIG. 15.

FIG. 15A shows the key processing of the history record estimation program F1400, and FIG. 15B shows the subroutine for searching a process history record string. It should be noted that the subroutine for searching a process history record string executes a recursive call.

First, the history record estimation program F1400 starts while using a history record relationship as an argument. The subroutine for searching a process history record string searches a history record that is latest history record among history records prior to the history record that is passed as an argument and returns, as a process history record string, the path to the history record that has been found based on the history record to be passed as an argument.

The term "process history record string" is a list structure which has a "History Record ID" or a "Process ID (Product Item ID)" as an element. For example, a process history record string having the history record H21, the process P31 (PC1) and the history record H41 as elements are expressed as [H21, P31 (PC1), H41]. The term "process P 31 (PC 1)" means a record related to PC1 in the process P31.

The history record estimation program F1400, when estimating a history record, uses the process table T1100 and the process relationship table T1200. Using the process table T1100, Work Place or Type of Work can be estimated. In addition, since Estimated Time in the process relationship table T1200 defines time difference between the previous and the next processes, it is possible to estimate the work date and time by using the history records of the previous and the next processes.

When the history record estimation program F1400 starts by the monitor program F1300 while using the history record relationship T1413 as an argument, the processing will be as follows.

The history record that is not "Pending" in the history record relationship T1413 is H41. In H41, the Product Item ID is PC1 and the Process ID is P41. Now, the subroutine for searching a process history record string starts while using "Product Item ID: PC1, Process ID: P41, Process History String: [H41]" as an argument (Step F1401).

Then, the previous process of the process P41 is searched. When the process relationship in which Next Process ID is P41 is searched by using the process relationship table T1200, two process relationships T1217 and T1218 are found (Step F1411(A)). Therefore, a previous process exists. Here, Step F1411(A) is expressed to discriminate from other steps that are called by a recursive call.

The process relationship T1217, "Previous Process ID: P 31, Next Process ID: P 41" which was found by search in Step F1411(A) is not derived yet (Step F1412).

When the process relationship is not derived yet, Product Item ID in the history record of the process P31 is acquired (Step F1413). Product Item ID in the history record of the process P41 is PC1, and items in Type of Product Item in the processes P31 and P41 are not changed. Therefore, Product Item ID in the history record of the process P31 is estimated to be PC1.

Now, a history record of the process P31 is searched. By using the history record table T1300, a history record in which Product Item ID is PC1 and Process ID is P31 is searched (Step F1414). However, such a history record is not found.

The subroutine for searching a process history record string starts while using "Product Item ID: PC 1, Process ID: P 31, Process History String: [P 31 (PC1 ), H41 ]) as an argument (Step F1415). That is, the subroutine for searching a process history record string is executed by a recursive call.

First, the previous process of the process P31 is searched (Step F1411(B)). Then, by using the process relationship table T1200, a process relationship in which Next Process ID is P31 is searched, and the process relationship T1214 is found. This means that a previous process exists.

The process relationship T1214, "Previous Process ID: P 21, Next Process ID: P 31", that was found in Step F1411(B) is not derived yet (Step F1412).

When the process relation is not derived yet, Product Item ID in the history record of the process P21 is acquired (Step F1413). Product Item ID in the history record of the process P31 is PC1, and items in Product Item Type in the processes P21 and P31 are not changed. Therefore, Product Item ID in the history record of the process P21 is estimated to be PC1.

Next, a history record of the process P21 is searched. Using the history record table T1300, a history record in which Product Item ID is PC1 and Process ID is P21 is searched (Step 1414), and the history record H21 is found.

Next, a history record relationship that is associated with the process relationship T1214 is searched. Using the history record table T1300 and the history record relationship table T1400, a history record in which Previous History Record ID is H21 and Next History Record ID is H31 is searched (Step F1417). However, such a history record relationship is not found.

The process history record string [H21, P31 (PC1), H41] is stored in the memory (Step F1418). This should be the return value of the subroutine for process history record string search.

Now, among history record relationships found in the search process in Step F1411(B), there is no history record relationship that is derived. Therefore, the subroutine for process history record string search is terminated (Step F1412). This will complete the subroutine for process history record string search which was subjected to a recursive call (Termination of calling F1415).

Next, the process relationship T1218, "Previous Process ID: P 32, Next Process ID: P 41", that was found in Step F1411(A) is not derived yet (Step F1412).

When the process relationship is not derived yet, Product Item ID in the history record of the process P32 is acquired (Step F1413). Product Item ID in the history record of the process P41 is PC1, and items in Product Item Type in the processes P32 and P41 are not changed. Therefore, Product Item ID in the history record of the process P32 is estimated to be PC1.

Next, a history record of the process P32 is searched. By using the history record table T1300, a history record in which Product Item ID is PC1 and Process ID is P32 is searched (Step 1414). However, such a history record is not found.

The subroutine for process history record string search starts while using "Product Item ID: PC 1, Process ID: P 32, Process History String: [P 32 (PC1 ), H41 ]) as an argument (Step F1415). This means that the subroutine for process history record string search is executed by a recursive call.

First, the previous process of the process P32 is searched (Step F1411(C)). Then, by using the process relationship table T1200, a process relationship in which Next Process ID is P32 is searched, and the two process relationships T1215 and T1216 are found. This means that a previous process exists.

The process relationship T1215, "Previous Process ID: P 21, Next Process ID: P 32", that was found in Step F1411(C) is not derived yet (Step F1412).

When the process relationship is not derived yet, Product Item ID in the history record of the process P21 is acquired (Step F1413). Product Item ID in the history record of the process P32 is PC1, and items in Product Item Type in the processes P21 and P32 are not changed. Therefore, Product Item ID in the history record of the process P21 is estimated to be PC1.

Next, a history record of the process P21 is searched. By using the history record table T1300, a history record in which Product Item ID is PC1 and Process ID is P21 is searched (Step 1414), and the history record H21 is found.

Next, a history record relationship that is associated with the process relationship T1215 is searched (Step F1417). Using the history record table T1300 and the history record relationship table T1400, a history record relationship in which Previous History Record ID is H21 and Next History Record Process ID is P32 is searched. However, such a history record relationship is not found.

Therefore, the process history record string [H21, P32 (PC1), H41) is stored in the memory (Step F1418). This should be the return value of the process history record string search.

Next, the process relationship T1216, "Previous Process ID: P 22, Next Process ID: P 32", that was found in Step F1411 (C) is not derived. (Step F1412).

When the process relation is not derived, Product Item ID in the history record of the process P22 is acquired (Step F1413). Product Item ID in the history record of the process P32 is PC1, and items in Product Item Type in the processes P22 and P32 are not changed. Therefore, Product Item ID in the history record of the process P22 is estimated to be PC1.

Next, a history record of the process P22 is searched (Step F1414). By using the history record table T1300, a history record in which Product Item ID is PC1 and Process ID is P22 is searched (Step 1414). However, such a history record is not found.

Therefore, the subroutine for process history record string search starts while using "Product Item ID: PC 1, Process ID: P 22, Process History String: [P 22 (PC1 ), P 32 (PC1 ), H 41 ] as an argument again (Step F1415). This means that the subroutine for process history record string search is executed by a recursive call again.

First, the previous process of the process P22 is searched (Step F1411(D)). Then, by using the process relationship table T1200, a process relationship in which Next Process ID is 22 is searched, and the two process relationships T1212 and T1213 are found.

At this time, the process relationship T1212, "Previous Process ID: P 11, Next Process ID: P 22", which was found in the search process in Step F1411(D) is not derived (Step F1412).

When the process relationship is not derived, Product Item ID in the history record of the process P11 is acquired (Step F1413). Product Item ID in the history record of the process P22 is PC1, and items in Product Item Type in the processes P11 and P22 are not changed. Therefore, Product Item ID in the history record of the process P11 is estimated to be PC1.

Next, a history record of the process P11 is searched. By using the history record table T1300, a history record in which Product Item ID is PC1 and Process ID is P11 is searched (Step 1414), and the history record H11 is found.

Next, a history record relationship that is associated with the process relationship T1212 is searched (Step F1417). By using the history record table T1300 and the history record relationship table T1400, a history record relationship in which Previous History Record ID is H11 and Next History Record Process ID is P22 is searched. However, such a history record relationship is not found.

Therefore, the process history record string [H11, P22 (PC1), P31 (PC1), H41] is stored in the memory (Step F1418). This should be the return value of the subroutine for process history record string search.

Next, the process relationship T1213, "Previous Process ID: P 12, Next Process ID: P 22", which was found in the search process in Step F1411 (D) is not derived (Step F1412).

When the process relationship is not derived, Product Item ID in the history record of the process P12 is acquired (Step F1413). Product Item ID in the history record of the process P22 is PC1, and items in Product Item Type in the processes P12 and P22 are not changed. Therefore, Product Item ID in the history record of the process P12 is estimated to be PC1.

Next, a history record of the process P12 is searched (Step F1414). By using the history record table T1300, a history record in which Product Item ID is PC1 and Process ID is P12 is searched. However, such a history record is not found.

Therefore, the subroutine for process history record string search starts while using "Product Item ID: PC 1, Process ID: P 12, Process History String: [P 12 (PC1 ), P 22 (PC1 ), P 31 (PC1 ), H41] as an argument again (Step F1415). This means that the subroutine for process history record string search is executed by a recursive call again.

Next, the previous process of the process P12 is searched (Step F1411 (E)). By using the process relationship table T1200, a process relationship in which Next Process ID is P12 is searched. However, such a process relationship is not found. Therefore, no previous process exists.

Therefore, the process history record string [P12 (PC1), P22 (PC1), P31 (PC1) H41] is stored in the memory (Step F1416). This should be the return value of the subroutine for process history record string search. This completes the subroutine for process history record string search (Termination of calling Step F1415).

Among history record relationships found in the search process in Step F1411(D), there is no history record relationship that is not derived (Step F1412). Therefore, the subroutine for process history record string search is terminated (Termination of calling up F1415).

Among history record relationships found in the search process in Step F1411(C), there is no history record relationship that is not derived (Step F1412). Therefore, the subroutine for process history record string search is terminated (Termination of calling up F1415).

Among history record relationships found in the search process in Step F1411(A), there is no history record relationship that is not derived (Step F1412). Therefore, the subroutine for process history record string search is terminated.

With such processing stated above, there are four process history record strings that are stored in the memory by executing the subroutine for process history record string search, namely, [H21, P31 (PC1), H41], [H21, P32 (PC1), H41), [H11, P22 (PC1), P32 (PC1), H41] and [P12 (PC1), P22 (PC1), P32 (PC1), H41].

As described above, estimated history records that include work prior to the history record H41 that is estimated based on the process relationships in FIG. 2A should have been acknowledged. In addition, among the process history record strings, there are three process history record strings of which leading elements are history records, namely, [H21, P31 (PC1), H41], [H21, P32 (PC1), H41], and [H11, P22 (PC1), P32 (PC1), H41]. If the leading element is not a history record, the path of the process has not been registered so far as history record information. Therefore, in this case, there is a low possibility that work was performed through the above path compared with through a path for which a history record has been registered.

Therefore, when there is a process history record string of which the leading element is a history record, process history record strings of which their leading elements are not a history record are removed from candidates for the estimated history record.

It should be noted that, when there is no process history record string of which the leading element is a history record, that is, when the leading elements of all process history record strings are a process, the step for removing the process history record strings from candidates is skipped (Step F1402), and all of them are designated as candidate process history record strings.

If a process history record string of which the leading element is a history record is adopted, processes in some history records are not passed through. Therefore, in this case, process history record strings of which their leading elements are a process are removed. The leading element of the process history record string [P12 (PC1), P22 (PC1), P32 (PC1), H41] is a process. Therefore, three remaining process history record strings are [H21, P31 (PC1), H41], [H21, P32 (PC1), H41], and [H11, P22 (PC1), P32 (PC1), H41] (Step F1403).

The leading elements of the process history record strings [H21, P31 (PC1), H41], [H21, P32 (PC1), H41], and [H11, P22 (PC1), P32 (PC1), H41] are H11 and H21. The processes of the history records H11 and H21 are the processes P11 and P21, respectively. A path from the process P11 to the process P21 exists, but a path from the process P21 to the process P11 does not exist. If the process history record string [H11, P22 (PC1), P32 (PC1), H41] is adopted, the history record H21 is not passed through since no path exists from the process P21 to the process P11. On the other hand, when the process history record string [H21, P31 (PC1), H41] or [H21, P32 (PC1), H41] is adopted, the history record H11 will certainly be passed through since a path exists from the process P11 to the process P12.

In consideration of the above, a possibility of the process history record string [H11, P22 (PCI), P32 (PC1), H41] is lower than other two process history record strings. Therefore, the process history record string [H11, P22 (PC1), P32 (PC1), H41] is removed from candidates (Step F1404). Now, remaining process history record strings are [H21, P31 (PC1), H41] and [H21, P32 (PC1), H41].

Next, an estimated history record is created from the candidate process history record strings obtained in the above (Step F1405).

First, a history record of the process P31 of the process history record string [H21, P31 (PC1), H41] will be estimated. To the history record to be estimated, a History Record ID (HX31) which uniquely identifies the history among all history records is issued. The Product Item ID in the history record of the process P31 is PC1. According to the process table T1100, the history record of the process P31 should be determined as "Work Place: Center 1, Type of Work: Inspection." From Work Date/Time "12/02 10:00" of the previous history record H21 and Estimated Time "24 hours" between the processes P21 and P31 (process relationship T1214), the estimated work date/time can be determined to be "12/03 10:00." From Work Date/Time of the next history record H41 "12/03 16:00" and Estimated Time "6 hours" between the processes P31 and P41 (process relationship T1217), the estimated work date/time can be determined to be "12/03 12:00." Therefore, the estimated work date/time should be between 12/03 10:00 and 12/03 12:00. Considering the above, an estimated history record "History Record ID: HX31, Estimated Work Date/Time: 12/03 10:00-12:00, Work Place: Center 1,Product Item ID: PC1, Work Description: Inspection, Process ID: P 31" is created for History Record ID: HX31, as shown in FIG. 13, and the estimated history is registered in the estimated history record table T1500. Similarly, to the process P32 of the process history record string [H21, P32 (PC1), H41], an estimated history record "History Record ID: HX32, Estimated Work Date/Time: 12/03 10:00-12:00, Work Place: Center 2, Product Item ID: PC1, Type of Work: Inspection, Process ID: P 32" is created for History Record ID: HX32, as shown in FIG. 13, and the estimated history record is registered in the estimated history record table T1500.

Next, an estimated history record relationship is created based on the estimated history (Step F1406).

First, to the process history record string [H21, P31 (PC1), H41], an estimated history record relationship is created. Since the estimated history of the process P31 is HX31, estimated history record relationships "Previous History Record ID: H21, Next History Record ID: HX31" and "Previous History Record ID: HX31, Next History Record ID: H41" are created, as shown in an estimated history record relationship T1611 and an estimated history record relationship T1612 shown in FIG. 14, and the estimated history record relationships are registered in the estimated history record relationship table T1600.

Similarly, to the process history record string [H21, P31 (PC1), H41], estimated history record relationships "Previous History Record ID: H21, Next History Record ID: HX32" and "Previous History Record ID: HX32, Next History Record ID: H41" are created, as shown in an estimated history record relationship T1613 and an estimated history record relationship T1614 shown in FIG. 14, and the estimated history record relationships are registered in the estimated history record relationship table T1600.

After the abovementioned processing, estimation is completed.

In the case where a history record has been estimated, when the search program F1200 starts while using "Product Item ID: PC1" as an argument, the subsequent processing will be as follows.

Using the history record table T1300 and the estimated history record table T1500, a history record in which Product Item ID is PC1 is searched (Step F1201 in FIG. 10). Then, three history records H11, H21 and H41 as well as two estimated history records HX31 and HX32 are found. First, one history record from the above five history records will be chosen. Here, the estimated history record HX31 is chosen.

From the history records found in Step F1201, the estimated history record HX31 has not been derived (Step F1202).

Next, using the history record relationship table T1400 and the estimated history record relationship table T1600, a history record relationship in which Next history record ID is HX31 is searched (Step F1203). Then, the estimated history record relationship T1611 in which Previous History Record ID is H21 and Next History Record ID is HX31 is found.

Next, by using the history record relationship table T1400 and the estimated history record relationship table T1600, a history record relationship in which Next History Record ID is HX21 is searched (Step F1203). Then, the estimated history record relationship T1411 in which Previous History Record ID is H11 and Next History Record ID is HX21 is found.

Next, using the history record relationship table T1400 and the estimated history record relationship table T1600, a history record relationship in which Next History Record ID is HX11 is searched (Step F1203). However, such a history record relationship is not found. In this case, by tracking previous history records, it is understood that the order is from history record H11 to history record H21 and estimated history record HX31.

Also, using the history record relationship table T1400 and the estimated history record relationship table T1600, a history record relationship in which Previous History Record ID is HX31 is searched (Step F1204). Then, the estimated history record relationship T1612 in which Previous History Record ID is HX31 and Next History Record ID is H41 is found.

Next, using the history record relationship table T1400 and the estimated history record relationship table T1600, a history record relationship in which Previous History Record ID is H41 is searched (Step F1204). However, such a history record relationship is not found. In this case, by tracking next history records, it is understood that the order is from estimated history record HX31 to history record H41.

From the history records found in Step F1201, the estimated history record HX32 has not been searched (Step F1202).

Next, by using the history record relationship table T1400 and the estimated history record relationship table T1600, a history record relationship in which Next History Record ID is HX32 is searched (Step F1203). Then, the estimated history record relationship T16113 in which Previous History Record ID is H21 and Next History Record ID is HX32 is found.

Next, using the history record relationship table T1400 and the estimated history record relationship table T1600, a history record relationship in which Next History Record ID is H21 is searched (Step F1203). Then, the history record relationship T1411 in which Previous History Record ID is H11 and Next History Record ID is HX21 is found.

Next, using the history record relationship table T1400 and the estimated history record relationship table T1600, a history record relationship in which Next History Record ID is H11 is searched (Step F1203). However, such a history record relationship is not found. In this way, by tracking next history records, it is understood that the order is from history record H11 to history record H21 to estimated history record HX32.

Next, using the history record relationship table T1400 and the estimated history record relationship table T1600, a history record relationship in which Previous History Record ID is HX32 is searched (Step F1204). Then, the estimated history record relationship T1614 in which Previous History Record ID is HX32 and Next History Record ID: H41 is found.

Next, using the history record relationship table T1400 and the estimated history record relationship table T1600, a history record relationship in which Previous History Record ID is H41 is searched (Step F1204).

However, such a history record relationship is not found. In this way, by tracking next history records, it is understood that the order is from estimated history record HX32 to history record H41.

Among the history records found in Step F1201, no history records that have not been searched does not exit (Step F1202). Therefore, the search processing is terminated.

With the abovementioned processing, it is understood that the path for PC1 is in the order from history record H11, history record H21, estimated history record HX31 to history record H41, or in the order from history record H11, history record H21, estimated history record HX32 to history record H41.

Results after search is performed on PC1 by using the search program F1200 is viewed as shown in FIG. 16. The display presents two paths that were estimated on PC1, and it also presents estimated date and time when the processes were performed.

Third Embodiment

Hereinafter, a third embodiment according to the present invention will be described with reference to FIGS. 17 to 20.

In the embodiments described above, description was made in the case where the product item is not changed, that is, in the case where a single manufactured product item is passed between processes. In actual processes, however, a product item is changed by assembling, disassembling, packing, and unpacking, etc. In the third embodiment, a method for registering history record information and creating history record relationships in those cases will be described. Here, as shown in FIG. 2B, a process relationship model for assembling a PC using a processing unit and a display will be exemplified.

Figure 17:
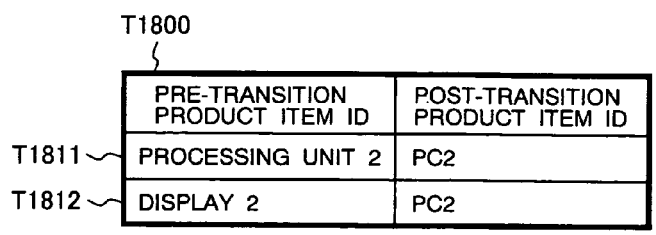
FIG. 17 is a diagram illustrating an example of a product item relationship table T1800.

FIG. 17 is a diagram illustrating an example of a product item relationship table T1800.

FIGS. 18A, 18B, 18C and 18D are diagrams illustrating phases of generating the history record relationship table T1400 according to the third embodiment of the present invention.

FIGS. 19A, 19B, 19C, and 19D are diagrams illustrating an example of the history record relationship table T1400 according to the third embodiment of the present invention.

Figures 20, 21, 22:
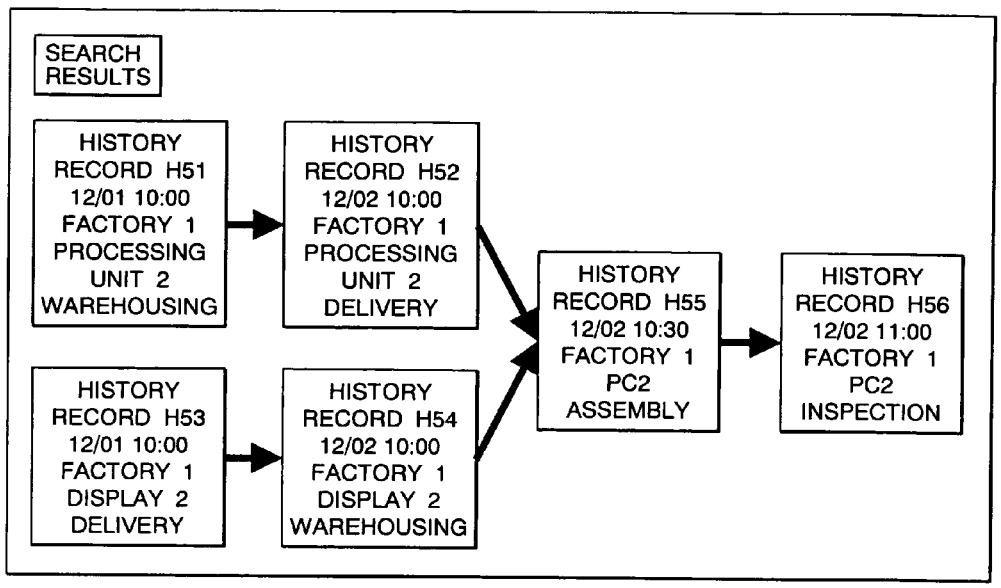
FIG. 20 is a diagram illustrating an example of search results for history records output in the order of work operations according to the third embodiment of the present invention.
FIG. 21 is a diagram illustrating an example of the estimated history record table T1500 according to a fourth embodiment of the present invention.
FIG. 22 is a diagram illustrating an example of the estimated history record relationship table T1600 according to the fourth embodiment of the present invention.

FIG. 20 is a diagram illustrating an example of search results for history records output in the order of work operations according to the third embodiment of the present invention.

In the present embodiment, a product item changes between processes, and it is necessary to register the corresponding relationships. A product item relationship table T1800 stores such relationship information of the product item.

The product item relationship table T1800 includes items, as shown in FIG. 17, such as a "Pre-Transition Product Item ID" which indicates a Product Item ID before transition is performed in the previous process and an "Post-Transition Product Item ID" which indicates a Product Item ID after transition is performed to the next process. Fore example, product item relationship information T1811 indicates that a processing unit 2 is transferred to PC2, and product item relationship information T1812 indicates that a display 2 is transferred to PC2. Further, combination of the product item relationship information T1811 and T1812 indicates that PC2 can be assembled with the processing unit 2 and the display 2. It is necessary that a system user register data in the product item relationship table T1800 in advance.

Hereinafter, processing of the history record registration program F1100 will be described with reference to FIG. 9 that was described.

It is assumed that the history records H51 and H53 have been registered in the history record table T1300 as shown in FIG. 18A and that relationships shown in FIG. 19A have been registered in the history record relationship table T1400.

When the history record registration program F1100 starts while using history record information, "Word Date/Time: 12/02 10:30, Work Place: Factory 1, Work Description: Assembly, Product Item ID: PC2", as an argument, the subsequent processing will be as follows.

Information indicating to which process the history record belongs is acquired from the information that identifies the process out of the history record information. It is understood, by using the process table T1100 and the product item attribute table T1700, that the process in which Product Item ID is PC2, Work Place is Factory 1, and Type of Work is Assembly is the process P55.

Next, the history record registration program F1100 issues a history record ID which uniquely identifies the history record among all history records to the history record information (Step F1102). For example, a history record ID H55 is issued to the history record information. The history record information including the history record ID is registered in the history record table T1300. The result is history record H55 shown in FIG. 18B.

Then, in Steps F1103 to F1106, a history record relationship between the history record H55 and the history of the previous process is created.

First, by using the process relationship table T1200, the previous process of the process P55 is searched (Step F1103). Then, two process relationships T1222 and T1223 are found as the process relationship in which Next Process ID is P55. This means that a previous process exists. First, one history record is chosen from the two history records. Here, it is assumed that the history record H55 is chosen.

For the process relationship T1222 in which Previous Process ID is P52 and Next Process ID is P55, a Product Item ID in the history record of the process P52 is acquired (Step F1104). Here, the types of product items have been changed: Product Item ID in the history record H55 is PC2; Type of Product Item in the process P52 is processing unit; and Type of Product Item in the process P55 is PC2. At this time, by using the product item attribute table T1700 and the product item relationship table T1800, a product item relationship in which Type of Product Item of Pre-Transition Product Item ID is Processing Unit and Post-Transition Product Item ID is PC2 is searched. Then, the product item relationship T1811 is found. The Product Item ID in the history record of the process P52 is processing unit 2. In addition, for the process relationship T1223 in which Previous Process ID is P54 and Next Process ID is P55, a Product Item ID in the history record of the process P54 is acquired. Here, the types of product items have been changed: the Product Item ID in the history record H55 is PC2; Type of Product Item in the process P54 is display; and Type of Product Item in the process P55 is PC. By using the product item attribute table T1700 and the product item relationship table T1800, a product item relationship in which Type of Product Item of Pre-Transition Product Item ID is Display and Post-Transition Product Item ID is PC2 is searched. Then, the product item relationship T1812 is found. The Product Item ID in the history record of the process P52 is display 2. It should be noted that, when there is means for creating a Product Item ID in the next history record from a Product Item ID in the previous history record, the product item relationship table T1800 may not be always required. It is assumed that, for a computer that is assembled with a processing unit AAA and a display BBB, a Product Item ID "AAABBB" is given. In this case, if the Product Item ID in the processing unit and the display are detected, the Product Item ID of the PC can be automatically obtained. In addition, it is also possible to obtain the Product Item ID in the processing unit and the Product Item ID in the display.

Next, a history record relationship which is associated with the process relationship T1222 is searched (Step F1105). Using the history record table T1300, a history record in which Product Item ID is Processing Unit 2 and Process ID is P52 is searched. However, such a history record is not found. Therefore, it is understood that no history record relationship that is associated with the process relationship T1222 has been registered. Further, a history record relationship which is associated with the process relationship T1223 is searched. Using the history record table T1300, a history record in which Product Item ID is Display 2 and Process ID is P54 is searched. However, such a history record is not found. Therefore, it is understood that no history record relationship that is associated with the process relationship T1223 has been registered. From the above, it is understood that no history record relationship that is associated with the process relationship T1223 has been registered.

Next, using a code indicating a history record of the previous process is pending, a history record relationship is tentatively registered in the history record relationship table T1400. Since the process relationships T1222 and T1223 belong to a group G1, a history record relationship that is associated with the process relationship T1222 and a history record relationship that is associated with the process relationship T1223 are both necessary. The history record relationships, therefore, will be tentatively registered. A history record relationship in which Previous History Record ID is Pending and Next History Record ID is H55 like a history record relationship T1423 shown in FIG. 17B and a history record relationship in which Previous History Record ID is Pending and Next History Record ID is H55 like a history record relationship T1424 shown in FIG. 19B are created, and the history record relationships are registered in the history record relationship table T1400 (Step F1107).

Then, in Steps F1108 to F111, a history record relationship between the history record H55 and the history record of the next process is created.

First, using the process relationship table T1200, the next process of the process P55 is searched (Step F1108). Then, a process relationship T1224 is found as a process relationship in which Previous Process ID is P55. This means that the next process exists.

For the process relationship T1224 in which Previous Process ID is P55 and Next Process ID is P56", a Product Item ID in the history record of the process P56 is acquired (Step F1109). The Product Item ID in the history record of the process P55 is PC2, and Type of Product Item has not changed in processes P55 and P56. Therefore, it is estimated that the Product Item ID in the history record of the process P56 is PC2.

Next, a history record relationship which is associated with the process relationship T1224 is searched. Using the history record table T1300, a history record in which Product Item ID is PC2 and Process ID is P56 is searched (Step F1110). However, such a history record is not found. Therefore, it is understood that no history record relationship that is associated with the process relationship T1224 has been registered.

Next, using a code indicating that a history record of the next process is pending, a history record relationship is tentatively registered in the history record relationship table T1400. Like the history record relationship T1425 shown in FIG. 19B, a history record relationship in which Previous History Record ID is H55 and Next History Record ID is Pending is created (Step F111).

Through the abovementioned processing, the history record H55 is registered, and the history record relationship table T1400 will be the one shown in FIG. 19B.

Next, when the history record registration program F1100 is executed while using the history record information of the history record H52 as an argument, the history record table T1300 will be the one shown in FIG. 18C, and the history record relationship table T1400 will be the one shown in FIG. 19C.

Next, when the history record registration program F1100 is executed while using the history record information of the history record H54 as an argument, and then it is executed while using the history record information of the history record H56, the history record table T1300 will be the one shown in FIG. 18D, and the history record relationship table T1400 will be the one shown in FIG. 19D.

Then, using the history record table T1300 and the estimated history record table T1500, a history record in which Product Item ID is PC2 is searched (Step F1201 shown in FIG. 10), and two history records H55 and H56 are found.

Among the history records found in Step F1201, the history record H55 has not been searched (Step F1202).

Therefore, using the history record relationship table T1400, a history record relationship in which Previous History Record ID is H55 is searched (Step F1203), and two history record relationships T1453 and T1454 are found.

Next, for the history record relationship T1453 in which Previous History Record ID is H52 and Next History Record ID is H55, which was found in the search process in Step F1203, a history record relationship in which Next History Record ID is H52 is searched using the history record relationship table T1400 (Step F1203), and the history record relationship T1411 in which Previous History Record ID is H51 and Next History Record ID is H52 is found.

Next, by using the history record relationship table T1400, a history record relationship in which Next History Record ID is H51 is searched (Step F1203). However, such a history record relationship is not found. In this way, by tracking previous history records, it is understood that the order is from history record H51, history record H52, to history record H55.

Next, for the history record relationship T1454 in which Previous History Record ID is H54 and Next History Record ID is H55, which was found in the search process in Step F1203, a history record relationship in which Next History Record ID is H54 is searched by using the history record relationship table T1400 (Step F1203), and the history record relationship T1411 in which Previous History Record ID is H51 and Next History Record ID is H52 is found.

Next, using the history record relationship table T1400, a history record relationship in which Next History Record ID is H53 is searched (Step F1203). However, such a history record relationship is not found. In this way, by tracking previous history records, it is understood that the order is from history record H53, history record H54 to history record H55.

Next, using the history record relationship table T1400 and the estimated history record relationship table T1600, a history record relationship in which Previous History Record ID is H55 is searched (Step F1204), and the estimated history record relationship T1614 in which Previous History Record ID is H55 and Next History Record ID is H55 is found.

Next, using the history record relationship table T1400, a history record relationship in which Previous History Record ID is H56 is searched (Step F1204). However, such a history record relationship is not found. In this way, by tracking next history records, it is understood that the order is from previous history record H55 to next history record H56.

Among the history records found in Step F1201, there is no history record that has not been searched (Step F1202). Therefore, the search processing is terminated.

Through the abovementioned processing, it is understood that the paths for PC2 is in the order from history record H51, history record H52, history record H55, to history record H56 and in the order from history record H53, history record H54, history record H55, to history record H56.

The search result concerning PC1 is output via an output device or a communication device as shown in FIG. 20. Based on the output, it is possible to understand that PC2 comprises the processing unit 2 and the display 2, and which paths each product item has been passed through.

Fourth Embodiment

Hereinafter, a fourth embodiment according to the present invention will be described with reference to FIGS. 21 and 22.

The present embodiment refers to a method for estimating a lacking history record in the case where a product item changes between processes same as in the third embodiment.

FIG. 21 is a diagram illustrating an example of the estimated history record table T1500 according to the fourth embodiment of the present invention.

FIG. 22 is a diagram illustrating an example of the estimated history record relationship table T1600 according to the fourth embodiment of the present invention.

Here, it is assumed that the history record relationship table T1400 is in the state where the history records H51, H52, H53 and H55 have been registered as shown in FIG. 19C.

It is understood that since the previous history record ID is Pending and a next history record ID exists in the history record relationship T1424, work in the previous history record has been completed but it has not been registered.

When the history record estimation program F1400 starts while using the history record relationship T1424 as an argument, the subsequent processing will be as follows.

The history record which is not Pending in the history record relationship T1424 is H55. In the history record H55, Product Item ID is PC2 and Process ID is P55. Now, the subroutine for process history record string search starts while using "Product Item ID: P2, Process ID: P 55, Process History String: [H55]" as an argument (Step F1401 shown in FIG. 15A).

The previous process of the process P55 is searched. Using the process relationship table T1200, a process relationship in which Next Process ID is P55 is searched (Step F1411 (A) shown in FIG. 15B), and two process relationships T1222 and T1223 are found. This means that the previous process exists.

The process relationship T1222 in which Previous Process ID is P52 and Next Process ID is P55, which was found in the search process in Step F1411 (A), has not been derived (Step F1412).

At this time, a Product Item ID in the history record of the process P52 is acquired (Step F1413). Here, the types of product items have changed: Product Item ID in the process P52 is PC2; Type of Product Item in the process P52 is processing unit; and Type of Product Item in the process P55 is PC. At this time, by using the product item attribute table T1700 and the product item relationship table T1800, a product item relationship in which Type of Product Item of Pre-Transition Product Item ID is Processing Unit and Post-Transition Product Item ID is PC2 is searched. Then, the product item relationship T1811 is found. The Product Item ID in the history record of the process P52 is processing unit 2.

Next, a history record of the process P52 is searched (Step F1414). Using the history record table T1300, a history record in which Product Item ID is Processing Unit 2 and Process ID is P52 is searched, and the history record H52 is found.

Next, a history record relationship which is associated with the process relationship T1222 is searched (Step F1417). Using the history record table T1300 and the history record relationship table T1400, a history record relationship in which Previous History Record ID is H52 and Next History Record ID is P55 is searched, and the history record relationship T1423 is found.

The process relationship T1223 in which Previous Process ID is P54 and Next Process ID is P55, which was found in the search process in Step F1411(A), has not been derived (Step F1412).

Next, a Product Item ID in the history record of the process P54 is acquired (Step F1413). Here, the types of product items have changed: the Product Item ID in the history record H55 is PC2; the Type of Product Item in the process P54 is display; and the Type of Product Item in the process P55 is PC2. At this time, using the product item attribute table T1700 and the product item relationship table T1800, a product item relationship in which Type of Product Item of Pre-Transition Product Item ID is Display and Post-Transition Product Item ID is PC2 is searched. Then, the product item relationship T1812 is found. The Product Item ID in the history record of the process P52 is display 2.

Next, a history record of the process P54 is searched (Step F1414). Using the history record table T1300, a history record in which Product Item ID is Display 2 and Process ID is P54 is searched. However, such a history is not found.

Now, the subroutine for process history record string search starts while using "Product Item ID: Display 2, Process ID: P 54, Process History String: [P 54 (Display 2 ), H55]" as an argument (Step F1415). This means that the subroutine for process history record string search is executed by a recursive call.

Next, the previous process of the process P54 is searched (Step F1411(B)). Using the process relationship table T1200, a process relationship in which Next Process ID is P54 is searched, and a process relationship T1221 is found. This means that the previous process exists.

The process relationship T1221 in which Previous Process ID is P53 and Next Process ID is P54, which was found in the search process in Step F1411(B) has not been derived (Step F1412).

At this time, a Product Item ID in the history record of the process P53 is acquired (Step F1413). Here, the Product Item ID in the process P54 is Display 2, and items in Type of Product Item in the processes P53 and P54 are not changed. Therefore, Type of Product Item in the process P53 is estimated to be display 2.

Next, a history record of the process P53 is searched (Step F1414). Using the history record table T1300, a history record in which Product Item ID is Display 2 and Process ID is P53 is searched, and the history record H53 is found.

Then, using the history record table T1300 and the history record relationship table T1400, a history record relationship in which Previous History Record ID is H53 and Next History Record Process ID is P54 is searched (Step F1417). However, such a history record relationship is not found.

Therefore, the process history record string [H53, P54 (Display 2), H55] is stored in the memory (Step F1418). This should be the return value of the subroutine for process history record string search.

Now, among the history record relationships found in the search process in Step F1411(B), there is no history record relationship that is not derived. Therefore, the subroutine for process history record string search is terminated (Step F1412). The subroutine for process history record string search which was executed by a recursive call is terminated (Termination of calling up F1415).

Next, among the history record relationships found in the search process in Step F1411(A), there is no history record relationship that is not derived. Therefore, the subroutine for process history record string search is terminated (Step F1412).

In this way, the process history record string that was stored in the memory by executing the subroutine for process history record string search is [H53, P54 (Display 2), H55]. The process history record string [H53, P54 (Display 2), H55] is a process history record string of which the leading element will be history.

Among the process history record strings, process history record strings of which their leading elements will be process are removed from candidates (Step F1402). The process history record string [H53, P54 (Display 2), H55] will not be removed from candidates since the leading element is not process. The remaining process history record string is [H53, P54 (Display 2), H55] (Step F1403).

Now, since the process history record string is only [H53, P54 (Display 2), H55], and history records that are not passed through will not be generated even if the above process history record string is adopted, the string will not be removed from candidates (Step F1404). Therefore, the remaining process history record string is only [H53, P54 (Display 2), H55].

Next, a history record of the process P54 of the process history record string [H53, P54 (Display 2), H55] is estimated (Step F1405).

History Record ID, HX54, which uniquely identifies the history record among all the history records, is issued to the history to be estimated. The Product Item ID in the process P54 is Display 2. According to the process table T1100, the history record of the process P54 should be determined as "Work Place: Factory 1, Type of Work: Delivery. Based on Estimated Time "1 week" between the processes P53 and P54 (process relationship T1221), Estimated Work Date/Time can be determined to be "12/08 10:00. Based on Work Date/Time of the next history record H55 12/02 10:30" and Estimated Time "30 minutes" between the processes P54 and P55 (process relationship T1223), Estimated Work Date/Time can be determined to be 12/02 10:00." Considering that Work Date/Time in the Previous Process P54 does not exceed Work Date/Time in the Next Process P55, the estimated work date/time should be between 12/02 10:00 and 12/02 10:30. Summarizing the above, an estimated history record "History Record ID: HX54, Estimated Work Date/Time: 12/02 10:00-10:30, Work Place: Factory 1, Product Item ID: Display 2, Type of Work: Delivery, Process ID: P 54" is created, and the estimated history record is registered in the estimated history record table T1500 as the estimated history record HX54 as shown in FIG. 21.

Next, an estimated history record relationship is created to the process history record string [H53, P54 (Display 2), H55] (Step F1406). Since the estimated history record of the process P54 is HX54, estimated history record relationship in which Previous History Record. ID is H53 and Next History Record ID is HX54 and estimated history record relationship in which Previous History Record ID is HX54 and Next History Record ID is H55 are created, and the estimated history record relationships are registered in the estimated history record relationship table T1600, as shown in an estimated history record relationship T1621 and an estimated history record relationship T1622.

The estimation is completed by executing the abovementioned processing.

Fifth Embodiment

Hereinafter, a fifth embodiment according to the present invention will be described with reference to FIGS. 23 and 24.

In the first embodiment, the method for setting up a history record table and a history record relationship table was described. In the fifth embodiment, a variant method for creating a history record relationship table is provided.

FIG. 23 is a diagram illustrating phases of generating the history record table T1300 according to the fifth embodiment of the present invention.

Figure 24:
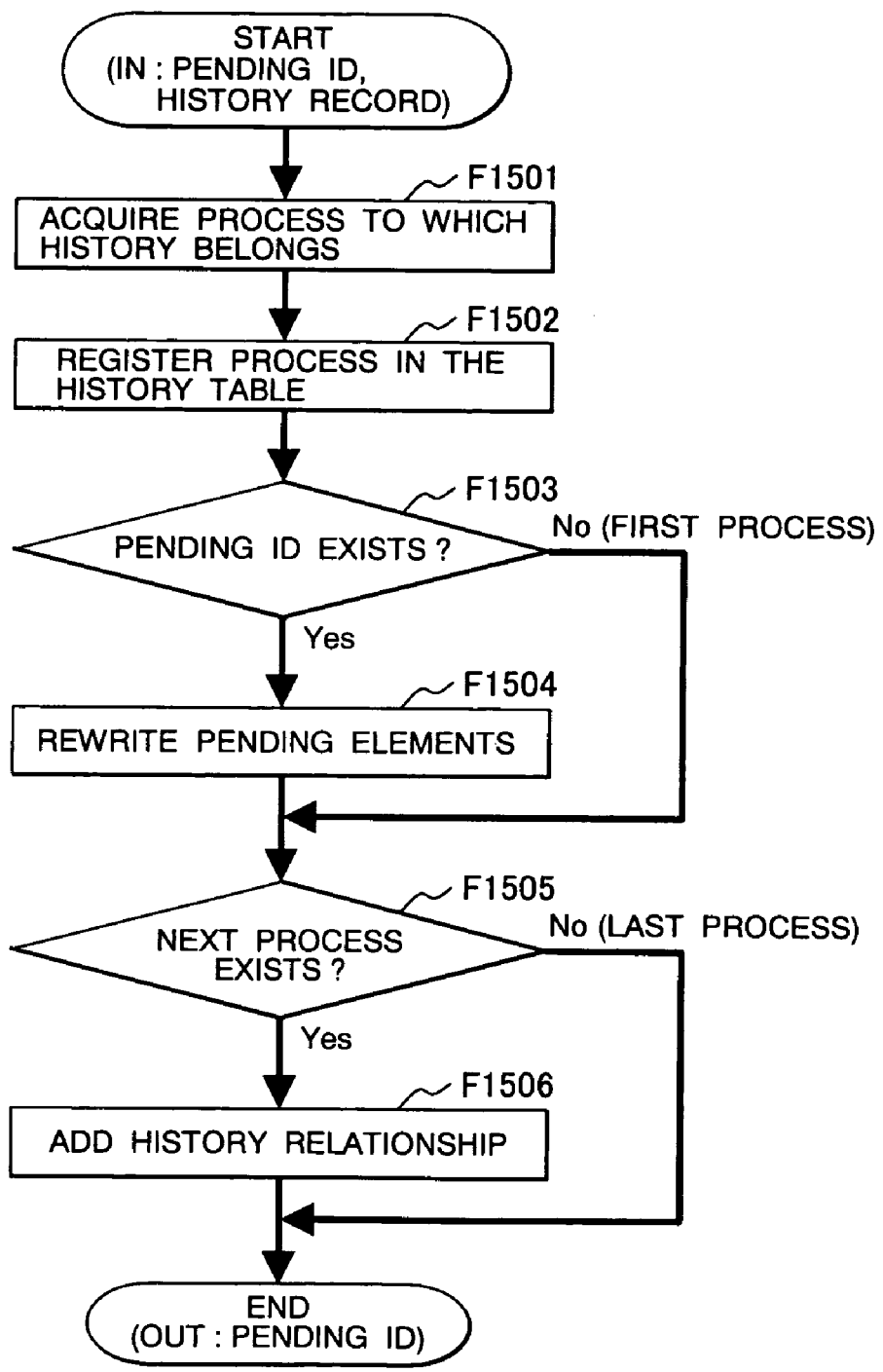
FIG. 24 is a flow chart illustrating the processing of the history record registration program F1500 according to the fifth embodiment of the present invention.

FIG. 24 is a flow chart illustrating the processing of the history record registration program F1500 according to the fifth embodiment of the present invention.

In the fifth embodiment, as shown in FIG. 23, an identifier, Pending ID is allocated to a history record in a pending state to discriminate a history record is in a pending state.

The history record registration program F1500 starts while using a Pending ID received from the previous process and history record information as arguments.

When registering a history record in a first process, a Pending ID does not exist since there is no previous process. When the history record registration program F1500 starts while using history records "Pending ID: N/A" and "Work Date/Time: 12/01 10:00, Work Place: Factory 1, Type of Work: Warehousing, Product Item ID: Processing Unit 2" as arguments, the subsequent processing will be as follows.

Information indicating to which process the history record belongs is obtained from the information which identifies the process among the history record information. It is understood, by using the process table T1100 and the product item attribute table T1700, that the process in which Product Item ID is Processing Unit 2, Work Place is Factory 1, and Type of Work is Warehousing is the process P51. It should be noted that, when the process ID is delivered to history record information, the process ID may be retrieved directly from the history record information, without using the product item attribute table T1700 or the process table T1100.

Next, the history record registration program F1500 issues a history record ID, which uniquely identifies the history record among all the history records, to the history record information (Step F1502). For example, a history record ID H51 is issued to the history record information. The history record information including the history record ID is then registered in the history record table T1300. Consequently, the history record information will be the history record H51 shown in FIG. 6.

Next, a history record relationship between the history record H51 and the history record of the previous process is created (Step F1503).

The history record registration program F1500 has not received the Pending ID. Therefore, the step for rewriting the Pending ID is skipped (Step F1503).

Then, in Steps F1505 and F1506, a history record relationship between the history record H51 and the history record of the previous process is created.

First, using the process relationship table T1200, the next process of the process P51 is searched (Step F1505), and a process relationship T1220 is found as a process relationship in which Previous Process ID is P51. This means that the next process exists. It should be noted that, when the next process does not exist, or when the process is the last process, the step for creating a history record relationship with the history record of the next process will be skipped.

Next, a history record relationship which is associated with the process relationship T1220, "Previous Process ID: P 51, Next Process ID: P 52", is tentatively registered in the history record relationship table T1400 (Step F1506). The history record registration program F1500 allocates Pending 1 to the history record in the process P52 as a tentative history record ID. Like a history record relationship T1431 in FIG. 23A, a history record relationship, "Previous history record ID: H51, Next history record ID: Pending", is created.

As a result of the abovementioned processing, the history record H51 is registered and the history record relationship is created, and the tentative history record ID, Pending 1 is received. When a product item targeted for work is moved to the next process, the information of Pending ID is carried along with the information of the Product Item. When an RFID or the like is used, the Pending ID may be stored in the RFID, etc.

Next, when the history record registration program F1500 starts while using history records "Pending ID: Pending 1" and "Work Date/Time: 12/02 10:00, Work Place: Factory 1, Type of Work: Delivery, Product Item ID: Processing Unit 2" as arguments, the subsequent processing will be as follows.

Information indicating to which process the history belongs, is obtained from the information which identifies the process from the history record information (Step F1501). It is understood, by using the process table T1100 and the product item attribute table T1700, that the process, "Product Item ID: Processing Unit 2, Work Place: Factory 1, Type of Work: Delivery" is the process P52.

The history record registration program F1500 issues a history record ID, which uniquely identifies the history record among all the history records, to the history record information. For example, a history record ID H52 is issued to the history record information. The history record information including the history record ID is then registered in the history record table T1300 (Step F1502). Consequently, the history record information will be the history record H52 shown in FIG. 6.

Then, in Steps F1503 and F1504, a history record relationship between the history record H52 and the history record of the previous process is created.

The history record registration program F1500 has received "Pending 1" (Step F1503).

The "Pending 1" element of the history record relationship table T1400 is rewritten to the history record H52 (Step F1504). The history record relationship T1431 will be the one as shown in FIG. 23B.

Then, in Steps F1505 and F1506, a history record relationship between the history record H52 and the history record of the next process is created.

First, using the process relationship table T1200, the next process of the process P51 is searched (Step F1505), and a process relationship T1222 is found as a process relationship in which Previous Process ID is P52. This means that the next process exists.

Next, a history record relationship which is associated with the process relationship T1222, "Previous Process ID: P 52, Next Process ID: P 55", is tentatively registered in the history record relationship table T1400 (Step F1506). The history record registration program F1500 issues "Pending 2" to the history record in the process P55 as a tentative history record ID. Like a history record relationship T1432 shown in FIG. 23B, a history record relationship, "Previous History Record ID: H52, Next History Record ID: Pending 2", is created.

As a result of the abovementioned processing, the history record H52 is registered and the history record relationship is created, and the tentative history record ID "Pending 2" is received.

Next, when the history records H53 and H54 are registered by the history record registration program F1500, the history record relationship table T1400 will be the one as shown in FIG. 23C. As a result of registering the history record H54, Pending 4 is received.

When assembling PC2 with Processing Unit 2 and Display 2, Pending 2 has already been received from Pending 2 from Processing Unit 2 and Pending 4 from Display 2. When the history record registration program F1500 starts while using history records "Pending ID: Pending 2, Pending 4" and "Work Date/Time: 12/02 10:30, Work Place: Factory 1, Type of Work: Assembly, Product Item ID: PC2" as arguments, the subsequent processing will be as follows.

Information indicating to which process the history belongs is obtained from the information which identifies the process from the history record information (Step F1501). It is understood, by using the process table T1100 and the product item attribute table T1700, that the process, "Product Item ID: PC2, Work Place: Factory 1, Type of Work: Assembly", is the process P55.

Next, the history record registration program F1500 issues a history record ID, which uniquely identifies the history record among all the history records, to the history record information. For example, a history record ID H55 is issued to the history record information. The history record information including the history record ID is then registered in the history record table T1300 (Step F1502). Consequently, the history record information will be the history record H55 shown in FIG. 6.

Then, in Steps F1503 and F1504, a history record relationship between the history record H55 and the history record of the previous process is created.

The history record registration program F1500 has received "Pending 2" and "Pending 4" (Step F1503).

Therefore, the "Pending 2" and "Pending 4" is rewritten to the history record H55 in the history record relationship table T1400 (Step F1504). As a result, history record relationships T1432 and T1434 are viewed as shown in FIG. 23D.

Next, by using the process relationship table T1200, the next process of the process P55 is searched (Step F1505), and a process relationship T1224 is found as a process relationship in which Previous Process ID is P55. This means the next process exists.

Next, a history record relationship which is associated with the process relation T1224, "Previous Process ID: P 55, Next Process ID: P 56", is tentatively registered in the history record relationship table T1400 (Step F1506). The history record registration program F1500 issues "Pending 5" to the history record in the process P56 as a tentative history record ID. Like a history record relationship T1435 shown in FIG. 23D, a history record relationship, "Previous History Record ID: H55, Next History Record ID: Pending 5", is created.

As a result of the abovementioned processing, the history record H55 is registered and the history record relationship is created, and the tentative history record ID "Pending 5" is received.

Effects of the Invention

As understood from the above embodiments, according to the present invention, it is possible to provide a process control system that is user-friendly and facilitates to control history records by improving traceability of history records concerning manufactured product items through estimating manufacturing history records even if history record information is not completely collected with respect to controlling history records using a computer system.

What is claimed is:

1. A process control system which is carried out by at least one computer, and which controls manufacturing and distribution processes of manufactured product items, the process control system comprising the at least one computer configured to:
   maintain a process table in which the manufacturing and distribution processes of the manufactured product items are defined for types of the manufactured product items;
   maintain a process relationship table in which a work order of processes is defined;
   maintain a history record table in which history record information on the manufacturing and distribution processes of manufactured product items is stored for manufactured product item IDs that identify the manufactured product items;
   maintain a history record relationship table defining a work order of history records indicated by the history record information;
   search a previous process and a next process, of a subject process to which a history record belongs as indicated by input history record information, in the process relationship table; and
   search the history record related to the previous process or the next process in the history record table,
   wherein:
   when the order of input history records inputted has a differing order than the work order of processes, a previous history record of the history record indicated by input history record information, not yet registered in the history record table, is registered in the history record relationship table with a history record indicated by input history record information by using a code for indicating that the previous history record is pending, and
   when history record information corresponding to the previous history record registered by using the code is subsequently input, the code is rewritten to a history record indicated by the history record information corresponding to the previous history record.

2. The process control system according to claim 1, comprising the at least one computer configured to handle:
   inputting the manufactured product item ID;
   searching history record information related to the manufactured product item ID based on information that is set in the history record table and the history record relationship table; and
   outputting the history record information in the work order of the history records.

3. The process control system according to claim 1, wherein
   with respect to a history record that is set in the history record relationship table, when a history record related to a previous process or a next process, which is to be derived from the process relationship table, has not been set, the history record that has not been set is monitored and predefined processing is executed after a specified period of time.

4. The process control system according to claim 1, comprising the at least one computer configured to:
   maintain an estimated history record table which stores history record information on the manufactured and distribution processes of the manufactured product items estimated for the manufactured product item IDs that identify the manufactured product items; and
   maintain an estimated history record relationship table which stores work order of history records estimated for the history records that have not been set in the history record relationship table;
   wherein with respect to a history record that has been set in that history record relationship table, when the previous history record which is to be derived from the process relationship table is registered by using the code for indicating that the previous history record is pending, the at least one computer configured to:
   set a process history record list for estimating order of history records, by using a history record, a process, and a product item ID,
   search a previous process of a process registered in the process history record list, in the process relationship table,
   acquire a product item ID of the history record related to the previous process, based on the history record table and the process table,
   register the searched previous process whose history record is unregistered, with the product item ID of the history record in the process history record list,
   with regard to the previous process registered in the process history record list, search a further previous process of the previous process, in the process relationship table,
   when the further previous process of the previous process is registered in the history record table, search the history record relationship registered, in the history record relationship table,
   when the history record relationship is registered by using the code for indicating that the previous history record is pending, register the further previous process of the previous process, in the process history record list,
   and based on the set process history record list,
   set a history record information on the estimated history records in the estimated history record table, and
   set an order of the estimated history records in the estimated history record relationship table.

5. The process control system according to claim 4, comprising the at least one computer configured to:
   based on work date and time that is an item stored in the history record table and on time information concerning the process stored in the process relationship table, set an estimated work date and time of the estimated history record, on said estimated history record table.

6. A computerized process control method which controls manufacturing and distribution processes of manufactured product items that are manufactured and distributed through a plurality of processes, the computerized process control method carried out by a computer and comprising:
   defining the manufacturing and distribution processes of the manufactured product item for a type of the manufactured product item;
   defining a work order of the processes;
   inputting history record information on the manufacturing and distribution of the manufactured product items that is identified by a manufactured product item ID;
   searching a previous process and a next process, of a subject process to which a history record belongs as indicated by input history record information, in process relationship table,
   searching the history record related to the previous process or the next process in the history record table,
   when the order of input history records inputted has a differing order than the work order of processes, registering a previous history record of the history record indicated by input history record information, not yet registered in the history record table, in the history record relationship table with a history record indicated by input history record information by using a code for indicating that the previous history record is pending, and when history record information corresponding to the previous history record registered by using the code is subsequently input, rewriting the code to a history record indicated by the history record information corresponding to the previous history record.

7. The computerized process control method according to claim 6, further comprising:

estimating a history record that is deemed not to have been set from a viewpoint of the work order of the processes in the order of the history records indicated by the history record information based on the defined processes and the defined work order of the processes; and sorting and outputting history records of the manufactured product item identified by the manufactured product item ID using the manufactured product item ID as a key based on the input history record information and the estimated history record.

8. The computerized process control method according to claim 6, wherein a history record that is deemed not to have been set from the viewpoint of the work order of the processes is monitored, and predefined processing is executed after a specified period of time elapses.

9. The process control system according to claim 1, comprising the at least one computer configured to:

acquire a process to which a history record belongs indicated by input history record information, from the process table, register the input history record information, in the history record table, acquire a product item ID of the history record related to the previous process or the next process of the history record indicated by the input history record information, based on the history record table and the process table, and when the history record related to the previous process or the next process is searched in the history record table, the history record is specified by the product ID.

10. The process control system according to claim 4, wherein, when there is a process history record list in which a leading element has a history record, a process history record list in which the leading element has a history record, is only used for set of the estimated history record table.

11. A process control system which is carried out by at least one computer, and which controls manufacturing and distribution processes of manufactured product items, the process control system comprising the at least one computer configured to:

maintain a process table in which the manufacturing and distribution processes of the manufactured product items are defined for types of the manufactured product items;

maintain a process relationship table in which a work order of processes is defined;

maintain a history record table in which history record information on the manufacturing and distribution processes of manufactured product items is stored for manufactured product item IDs that identify the manufactured product items;

maintain a history record relationship table defining a work order of history records indicated by the history record information;

search a previous process and a next process, of a subject process to which a history record belongs as indicated by input history record information, in the process relationship table; and search the history record related to the previous process or the next process, in the history record table, wherein:

when the order of input history records inputted has a differing order than the work order of processes, a previous history record of the history record indicated by input history record information, not yet registered in the history record table, is registered in the history record relationship table with a history record indicated by input history record information by using a pending registration code for indicating that the previous history record is pending, and when history record information corresponding to the previous history record registered by using the pending registration code is subsequently input, the pending registration code is rewritten to a history record indicated by the history record information corresponding to the previous history record.

* * * * *